US012325018B2

(12) United States Patent
Reichmuth et al.

(10) Patent No.: US 12,325,018 B2
(45) Date of Patent: Jun. 10, 2025

(54) PIPETTE FOR USE WITH A PIPETTE TIP AND PIPETTE TIP LINE COMPRISING SEVERAL PIPETTE TIPS OF DIFFERENT TYPES FOR USE WITH A PIPETTE

(71) Applicant: Eppendorf AG, Hamburg (DE)

(72) Inventors: Burkhardt Reichmuth, Hamburg (DE); Uwe Dunker, Hamburg (DE); Jons Wilmer, Hamburg (DE); Tobias David, Bargteheide (DE)

(73) Assignee: Eppendorf AG, Hamburg (DE)

( * ) Notice: Subject to any disclaimer, the term of this patent is extended or adjusted under 35 U.S.C. 154(b) by 1031 days.

(21) Appl. No.: 16/974,160

(22) PCT Filed: Apr. 23, 2019

(86) PCT No.: PCT/EP2019/060324
§ 371 (c)(1),
(2) Date: Oct. 23, 2020

(87) PCT Pub. No.: WO2019/206879
PCT Pub. Date: Oct. 31, 2019

(65) Prior Publication Data

US 2023/0110524 A1 Apr. 13, 2023

(30) Foreign Application Priority Data

Apr. 23, 2018 (EP) .................................... 18168763

(51) Int. Cl.
*B01L 3/02* (2006.01)

(52) U.S. Cl.
CPC ........... *B01L 3/0224* (2013.01); *B01L 3/0237* (2013.01); *B01L 3/0279* (2013.01); *B01L 2200/143* (2013.01); *B01L 2400/0478* (2013.01)

(58) Field of Classification Search
CPC .... B01L 3/0224; B01L 3/0237; B01L 3/0279; B01L 2200/143; B01L 2400/0478; B01L 3/0275; B01L 3/0217
See application file for complete search history.

(56) References Cited

U.S. PATENT DOCUMENTS 4,679,446 A 7/1987 Sheehan et al.
4,905,526 A * 3/1990 Magnussen, Jr. ..... B01L 3/0227 73/864.18

(Continued)

FOREIGN PATENT DOCUMENTS

CN 103285952 A 9/2013
DE 19948818 A1 * 5/2001 ............ B01L 3/0234

(Continued)

OTHER PUBLICATIONS

Chinese application 201980028199.X; filed Apr. 23, 2019; English translation of CN Office Action; Date of Notification Oct. 9, 2021 (9 pages).

(Continued)

*Primary Examiner* — Matthew D Krcha
*Assistant Examiner* — Sophia Y Lyle
(74) *Attorney, Agent, or Firm* — Barclay Damon LLP

(57) ABSTRACT

A pipette comprises a pipette housing, a neck configured to clamp on a pipette tip, and a drive apparatus. The drive apparatus comprises a drive element configured to displace a displacement element to draw a liquid sample into the pipette tip and to eject the liquid sample from the pipette tip. A scanning apparatus comprises a scanning element positioned proximate the neck and configured to be displaced relative to the pipette housing by a collar of the pipette tip when clamping the pipette tip onto the neck. A mechanical display apparatus is coupled to the scanning apparatus and comprises a display. When the pipette tip is clamped to the neck the scanning apparatus is configured to adjust the (Continued)

display depending on a height of the collar of the pipette tip relative to the neck, and the neck is configured to accommodate different collar heights.

15 Claims, 12 Drawing Sheets

(56) References Cited

U.S. PATENT DOCUMENTS

| | | | | |
|---|---|---|---|---|
| 6,749,812 | B2 | 6/2004 | Cronenberg et al. | |
| 2002/0001545 | A1* | 1/2002 | Cronenberg | G01N 35/10 73/864.11 |
| 2003/0074989 | A1* | 4/2003 | Magnussen, Jr. | B01L 3/0279 73/864.14 |
| 2007/0227271 | A1 | 10/2007 | Curtis et al. | |
| 2012/0039768 | A1 | 2/2012 | Strzelczyk | |
| 2013/0199312 | A1* | 8/2013 | Wilmer | G01F 11/027 73/864.14 |
| 2016/0051978 | A1* | 2/2016 | Voyeux | B01L 3/022 422/522 |

FOREIGN PATENT DOCUMENTS

| | | | |
|---|---|---|---|
| DE | 102007010299 | A1 | 9/2008 |
| DE | 102007012299 | A1 | 9/2008 |
| EP | 0152120 | | 8/1985 |
| EP | 0152120 | A2 | 8/1985 |
| EP | 2236207 | A1 | 10/2010 |
| EP | 2574402 | A1 | 4/2013 |
| EP | 2676730 | A1 | 12/2013 |
| JP | 2004501745 | A | 1/2004 |
| JP | 2006231326 | A | 9/2006 |
| JP | 2007516836 | A | 6/2007 |
| JP | 2010520039 | A | 11/2010 |
| SU | 597411 | | 12/1975 |
| SU | 597411 | A1 | 3/1978 |
| WO | 2011/110141 | A1 | 9/2011 |

OTHER PUBLICATIONS

Chinese application 201980028199.X; filed Apr. 23, 2019; CN Office Action; Date of Notification Oct. 9, 2021 (12 pages).

Eppendorf AG; PCT/EP2019/060324; International Filing Date Apr. 23, 2019; International Search Report (6 pages).

Eppendorf AG; PCT/EP2019/060324; International Filing Date Apr. 23, 2019; English Translation of International Search Report (4 pages).

Japanese application 2020555476; filed Apr. 23, 2019; English translation of JP Office Action; Dispatch Date Jun. 27, 2023 (2 pages).

Japanese application 2020555476; filed Apr. 23, 2019; JP Office Action; Dispatch Date Jun. 27, 2023 (2 pages).

* cited by examiner

PIPETTE FOR USE WITH A PIPETTE TIP AND PIPETTE TIP LINE COMPRISING SEVERAL PIPETTE TIPS OF DIFFERENT TYPES FOR USE WITH A PIPETTE

This application is a national stage application pursuant to 35 U.S.C. § 371 of International Application No. PCT/EP2019/060324, filed on Apr. 23, 2019, which claims priority to, and benefit of, European Patent Application No. 18 168 763.3, filed Apr. 23, 2018, the entire contents of which are hereby incorporated by reference.

TECHNICAL FIELD

The invention relates to a pipette for use with a pipette tip. Furthermore, the invention relates to a pipette tip line comprising several pipette tips of different types for use with a pipette.

BACKGROUND

Pipettes are utilized in particular in scientific and industrial laboratories in medical, molecular biological and pharmaceutical areas of application for dosing selected volumes of liquids. The liquids can in particular be homogeneous (single phase) liquids consisting of a single liquid component, or a homogeneous mixture of a plurality of liquid components (solutions). Furthermore, the liquids can be heterogeneous (multiphase) mixtures of a liquid with another liquid (emulsions), or a solid (suspensions).

Pipettes have a rod-shaped pipette housing with a neck (attachment) on the bottom end for clamping on a pipette tip. The neck is frequently a conical, cylindrical or sectionally conical and cylindrical projection, and is also termed a "working cone". A pipette tip is a hollow tube with a tip opening in the bottom end and a mounting opening in the upper end with which the pipette tip can be clamped to the neck. The liquid is drawn into the pipette tip and discharged therefrom. The drawing and discharging of liquid is controlled by means of the pipette. Fixed volume pipettes serve to pipette constant volumes. With variable pipettes, the volume to be dosed is adjustable. A mechanical counter is used to display the adjusted volume. To adjust the volume, the stroke of the drive apparatus is adjustable by means of an adjusting apparatus that is coupled to the counter. After use, the pipette tip is detached from the attachment, and can be exchanged for a fresh pipette tip. In this way, contamination during subsequent pipetting can be avoided.

Air cushion pipettes have a plunger/cylinder system in the pipette housing that is connected by a channel to a hole in the neck. Pipette tips for air cushion pipettes (air cushion pipette tips) do not have an integrated plunger. By displacing the plunger in the cylinder, an air cushion is moved for aspirating liquid into a pipette tip clamped onto the neck, and ejecting it therefrom. A disadvantage with air cushion pipettes are dosing errors arising from the change in the length of the air cushion from the weight of the aspirated liquid, and the influence of temperature, air pressure and humidity. Contamination of the pipette with aerosols can also be problematic.

Positive displacement pipettes are used with pipette tips with integrated plungers (positive displacement pipette tips). This type of pipette has a neck for fastening the pipette tip, and a drive apparatus that can be coupled to the integrated plunger for moving the plunger. The plunger comes directly into contact with the liquid so that the effects of an air cushion do not exist. Positive displacement pipettes are in particular suitable for dosing liquids with a high vapor pressure, high viscosity or high density, and applications in molecular biology in which freedom from aerosols is important in order to avoid contamination. Air cushion or positive displacement pipette tips for single use or reuse are comprised of plastic or of glass.

Pipettes are offered in different sizes with a matching pipette tip type in each case, or several matching pipette tip types, with nominal volumes that are close to each other. For different applications, the user must have pipettes and pipette tips of different sizes, which generates corresponding purchase, servicing and storage costs. The identification of pipettes and pipette tips by a color code is known in order to facilitate correct assignment. In this case, the hazard exists of misinterpretation by the user.

EP 2 574 402 B1 describes a syringe for use with a dosing device that has a code on the top edge of the syringe cylinder depending on the type of syringe. Moreover, a dosing device for use with a syringe is described that has a scanning apparatus with a ring sensor for scanning the code which is connected to an evaluation apparatus that controls the dosing device to assume an operating state depending on the code in the event of error-free scanning. This comprises for example the display of the set dosing volume.

DE 199 48 818 A1 describes a syringe with a code at the upper end of the syringe plunger, and a pipette ("syringe holder") with an information reader for reading the code. When a certain syringe of a certain type is recognized, for example a 50 mL syringe, this value can be output by optical display elements (such as LEDs or LCDs).

WO 2011/110141 A1, SU 597 411 A1 and U.S. Pat. No. 4,679,446 A describe air cushion pipettes with attachments which are divided into several conical sections with steps in between, wherein the different conical sections have different clamping zones for clamping on pipette tips of different sizes. Several channels extend through the neck, one of which terminates in the central, bottom face of the neck, and the others terminate at the bottom sides of the steps. The other ends of the channels are connected to plunger/cylinder systems. Given the several channels in the neck and the several plunger/cylinder systems, these air cushion pipettes are complex in design. Clamping on pipette tips of different sizes is associated with different mounting forces due to the different clamping zones.

EP 0 152 120 A2 describes an air cushion pipette tip that comprises a digital, linear drive module and displacement modules connected thereto of different sizes with conical necks for clamping pipette tips. A pipette tip which is of a certain size and adapted to the displacement modules can be clamped onto the necks of the different displacement modules. In order to work with pipette tips of different sizes, it is necessary to exchange the displacement module with the displacement module adapted to the pipette tip size.

US 2002/0001545 A1 and U.S. Pat. No. 6,749,812 B2 describe an air cushion pipette with an automated tip ejector that has a spring-loaded attachment for mounting pipette tips and a spring-loaded ejector sleeve guided thereupon. Furthermore, there is a tip recognition of pipette tips in which different tip types have a different basic configuration. With this tip recognition, different pipette tip types are recognized by a differing displacement of the attachment relative to the ejector sleeve which is detected by means of an electronic sensor.

The known pipettes have the disadvantage that pipette tips or syringes are recognized by means of electronic sensors. In this case, both the displacement of the attachment as well as the displacement of the ejector sleeve are detected by means of electronic sensors. The electronic sensors can be subjected to strong stresses from forces, vapors, etc. and are at risk of failing. The electronics increase the design complexity and device cost. Moreover, the electronics restrict the possibilities for sterilizing the pipettes. The different pipette tip types have clamping surfaces of different sizes on the attachment.

BRIEF SUMMARY OF THE INVENTION

Against this backdrop, the object of the invention is to create a pipette that is less subject to failure and that can be used with pipette tips of different types. Furthermore, a pipette tip line comprising a plurality of pipette tips of different types is created that can be used with the same pipette which is less subject to failure.

An embodiment of a pipette for use with a pipette tip comprises a rod-shaped pipette housing, a neck at the bottom end of the pipette housing for clamping on a pipette tip with a collar having a mounting opening at its upper end, a drive apparatus comprising a drive element for displacing a displacement element for drawing in liquid samples into the pipette tip and ejecting the samples from the pipette tip, and an operating element projecting from the pipette housing and displaceable relative to the pipette housing. The pipette further comprises a scanning apparatus including a scanning element arranged next to the neck and displaceable in the longitudinal direction of the neck relative to the pipette housing for being displaced by the collar of a pipette tip when clamping the pipette tip onto the neck. A mechanical display apparatus is coupled to the scanning apparatus, wherein the scanning apparatus is configured to adjust a display of the display apparatus which depends on the position of the scanning element relative to the pipette housing, and further configured to adjust a display depending on the type of pipette tip by clamping a pipette tip with a collar height characteristic of the type of pipette tip onto the neck.

The foregoing disclosure is also direct to an embodiment of a pipette suitable for use with a pipette tip of a pipette tip line. Pipette tips of different types can be clamped onto the neck of the same pipette. These form a pipette tip line. Pipette tips of different types differ in particular with respect to one or more of the following features: nominal volume; shape; dimensions; material (such as PP and/or PE) without or with a coating; dimensions without or with surface treatment (such as treatment with a pearl effect for improved streaming-off of detergent-containing liquids); tubes without or with an inserted filter (filter tip); electrically insulating or electrically conductive; degree of purity (such as standard, sterile, protein-free and PCR-free, biologically pure). Pipette tips of different types have collars of different heights. Pipette tips of the same type have collars with the same height. The height of the collar is characteristic of the type of pipette tip. The collar is the region at the upper end of the pipette tip with which this pipette tip projects upward from the neck, or respectively dips into the neck when the pipette tip is clamped onto the neck. For clamping onto the neck, the pipette tip has a seat region on the inner circumference of the collar. The scanning element is arranged next to the neck so that it is displaceable by the collar of a pipette tip when the tip is clamped onto the neck. The scanning element is therefore suitable for being displaced by the collar of a pipette tip clamped onto the neck. In so doing, the scanning element can be displaced to a different extent by collars of different heights. However, it can also be not displaceable by a collar with a lesser height and displaceable by a collar (or several of different heights) with a greater height. Depending on the height of the collar detected by the scanning element, the scanning apparatus adjusts the display of the display apparatus. The display comprises for example a volume display or a display of another feature of the pipette tip. The user can use pipette tips of different types and directly read a display depending on the employed type. Automatically, the display is adapted to the type of pipette tip used in each case. The mechanical display apparatus is a display apparatus with which the different displays can be mechanically adjusted. To adjust the display, the display apparatus is coupled to the scanning apparatus. The display is adjusted by displacement of the scanning element. Since the pipette does not require any electrical sensor for detecting the pipette tip type, the risk of failure is reduced. It is also advantageous that the pipette can be configured in a purely mechanical manner without electronic components so that there is no exchanging of batteries, or respectively charging of batteries, and the possibilities of sterilization are expanded.

According to one embodiment of the invention, the display depending on the type of pipette tip comprises or is a volume display. With this embodiment, the different types of pipette tips are pipette tips with different nominal volumes. The nominal volume is the volume of the pipette tip that can be used for pipetting. The nominal value is established by the manufacturer and is used to indicate the measuring range. According to another embodiment, the height of the collar increases with the nominal volume of the pipette tip. According to different embodiment, the height of the collar decreases with the nominal volume of the pipette tip. The volume display comprises at least one volume displayed by the display apparatus. Given a variable pipette, this is the doseable volume with a mounted pipette tip with a specific nominal volume at a specific adjustment of the adjusting apparatus, and/or given a variable pipette or fixed volume pipette, this is the nominal volume of the clamped-on pipette tip. As the nominal volume of the pipette tip increases, the volume display is moved toward higher values. This automatically adapts the volume display to the pipette tip used in each case. The user can use pipette tips with different nominal volumes and read the adjusted pipetting volume and/or the nominal volume without interpretation effort directly from the display element.

According to another embodiment, the mechanical display apparatus shows a display depending on a specific type of pipette tip when the scanning element is not displaced by the collar of a pipette tip mounted on the neck. This is the case when a pipette tip is not mounted on the neck, or when a pipette tip is mounted on the neck with a short collar that is not high enough to displace the scanning element. In both cases, the display apparatus is adjusted such that it displays a display depending on the type of pipette tip with the short collar. In this case, the scanning element can be held by a stop apparatus in an initial position from which it is not displaced when a pipette tip with the short collar is clamped onto the neck. When a pipette tip with a long collar that is high enough to displace the scanning element is clamped onto the neck, the scanning apparatus adjusts a display which depends on the type of mounted pipette tip with the long collar. In another embodiment, the display of the display apparatus is always adjusted when a pipette tip with a collar is mounted on the neck.

According to another embodiment, the operating element is coupled to the drive element. According to another embodiment, the operating element is tightly connected to the drive element or coupled thereto via a gearing. In still another embodiment, the pipette is an air cushion pipette for use with an air cushion pipette tip. According to another embodiment, a displacement apparatus is arranged in the pipette housing and is connected via a channel to a hole in the bottom end of the neck. According to another embodiment, the displacement apparatus is a displacement chamber with a displacement element that can be displaced therein. According to another embodiment, the displacement apparatus is a cylinder with a displaceable plunger sealingly guided therein. According to another embodiment, the drive element is a stroke rod that is vertically displaceable in the pipette housing and is coupled at the bottom end to the displacement element and at the upper end to the operating element. According to another embodiment, the operating element is an operating button which projects from the upper end of the pipette housing and can be pressed at least partially thereinto.

According to another embodiment, the pipette is a positive displacement pipette for use with a positive displacement pipette tip. According to another embodiment, the drive element is a stroke rod guided in a vertical through-channel of the neck with a vertical borehole in the bottom end for clamping a plunger rod projecting from the integrated plunger of a pipette tip. According to another embodiment, the upper end of the stroke rod is coupled to the operating element. According to another embodiment, the operating element is an operating button which projects from the upper end of the pipette housing and can be pressed at least partially into the pipette housing.

According to another embodiment, the pipette is a fixed volume pipette. The drive element can be displaced back and forth by a defined measuring stroke in the fixed volume pipette. When configured as a positive displacement pipette, the pipette can be used with positive displacement pipette tips that have different diameters of the tube and plunger diameters adapted thereto in each case in order to pipette different volumes with the same measuring stroke. According to another embodiment, the fixed volume pipette has a display apparatus which displays the nominal volume of a pipette tip clamped onto the attachment.

According to another embodiment, the pipette is a variable pipette. This has an adjustable volume. According to another embodiment, the measuring stroke of the pipette is adjustable. According to another embodiment, the pipette has a display apparatus that displays the adjusted measuring stroke. According to another embodiment, the display device is a counter. According to another embodiment, the variable pipette comprises a first adjusting element for adjusting the volume that is arranged on the upper end of the pipette housing. According to another embodiment, the first adjusting element is simultaneously the operating element or an additional component. When configured as an additional component, the first adjusting element is for example a sleeve-shaped adjusting knob rotatably mounted on the upper end of the pipette housing that surrounds an operating button, wherein the operating button can be at least partially pressed into the adjusting knob. According to another embodiment, the variable pipette has a display apparatus which displays the nominal volume of a pipette tip clamped onto the attachment. According to another embodiment, the display apparatus displays the nominal volume in addition to the adjusted volume.

According to another embodiment, the pipette has a plunger spring that displaces the drive element upwards after the operating element is released until a first stop apparatus takes effect (is contacted). By actuating the operating element, the stroke rod can be displaced downward opposite the effect of the plunger spring until a second stop apparatus takes effect (is contacted). According to another embodiment, the operating element is coupled via a gearing to the drive element which makes it possible to drive the drive element in different directions. According to another embodiment, the drive apparatus comprises a switching apparatus so that when the operating element is actuated, first the drive element can be displaced downward until the second stop apparatus takes effect and, upon further actuating the operating element, the switching apparatus controls the displacement of the drive element in the opposite direction until the first stop apparatus takes effect.

According to another embodiment, the nominal volumes of the pipette tips or other features of the pipette tips characteristic of the type that can be used with the pipette are noted on the pipette, and/or the pipette is provided with one or more IDs that refer to the nominal volumes or other features of the pipette tips characteristic of the type which can be used with the pipette. According to another embodiment, the nominal volumes or other features characteristic of the type are noted on the pipette tips, and/or the pipette tips are provided with one or more IDs that refer to the nominal volumes or other features characteristic of the type.

According to another embodiment, the neck is tightly connected to the pipette housing, wherein preferably the neck is immovable relative to the pipette housing. The neck can be connected directly or indirectly to the pipette housing. In particular, the neck can be tightly connected to a frame or chassis that bears the pipette housing and is tightly connected thereto.

According to another embodiment, the scanning apparatus comprises a pusher displaceably guided on the pipette housing in a vertical direction that has the scanning element on the lower pusher end, and whose upper pusher end is coupled to the display apparatus. In this embodiment, the lower pusher end and therefore the pusher can be displaced upward to a different extent by clamping on pipette tips with collars of different heights onto the neck. During the displacement the upper pusher end acts on the display apparatus and correspondingly adjusts the volume display or another display depending on the type of pipette tip.

According to another embodiment, the pusher bears different nominal volume data one over one another in a vertical direction on an outer side, or different other data characterizing the type of pipette tip, and the pipette housing has a window in the displacement region of the nominal volume data or the other data of the pusher, through which only one complete nominal volume datum or one complete other datum on the pusher is visible from the outside. The nominal volume datum or other information and the window are arranged such that for each pipette tip mounted on the neck, the associated nominal volume datum or other information is visible from the outside through the window. This is controlled by the height of the collar of the pipette tip. This makes which type of pipette tip is mounted easily discernible for the user.

According to another embodiment, the pipette comprises a first stop apparatus with a first stop element on the drive apparatus and a second stop element on the pipette housing that can be brought into contact against each other by displacing the drive element in a first direction, and a second stop apparatus with a third stop element on the drive apparatus and a fourth stop element on the pipette housing that can be brought into contact against each other by displacing the drive element in a second direction that is opposite the first direction in order to define, together with the first stop apparatus, a measuring stroke of the drive apparatus.

According to another embodiment, the pipette comprises an adjusting apparatus with a first adjusting element mounted on the pipette housing, and a second adjusting element on the first or second stop apparatus for adjusting the measuring stroke by adjusting the first adjusting element, and a mechanical counter coupled to the adjusting apparatus for displaying the adjustment of the adjusting apparatus, wherein the scanning apparatus is coupled to a mechanical range adjusting apparatus on the counter that is designed so that it adjusts a count range of the counter which depends on the position of the scanning element relative to the pipette housing.

According to another embodiment, the range adjusting apparatus comprises a mark on the upper pusher end arranged on the outside in front of the counter, wherein the pusher can be displaced upward to a varying extent when clamping pipette tips with collars of different heights on the neck in order to position the mark to display different count ranges laterally next to or between different positions of the counter. In this embodiment, the mark is positioned laterally next to or between different positions of the counter by collars of different heights, i.e., laterally next to or behind the first pre-decimal position, and/or laterally next to or in front of the first post-decimal position. Depending on the height of the collar, the mark can be adjusted such that the counter directly displays the volume pipettable by the mounted pipette tip with the given adjustment of the measuring stroke. This allows the count range of the counter to be shifted by one or more powers of ten. This enables pipette tips to be used whose nominal volumes differ from each other by one or more powers of ten using the same pipette.

According to another embodiment, the range adjusting apparatus comprises a switchable gearing by means of which the counter is coupled to the adjusting apparatus. By switching the switchable gearing, different transmission ratios of the gearing can be selected. Depending on the height of the collar, the gearing can be switched such that the counter displays the volume pipettable by the mounted pipette tip with the given adjustment of the measuring stroke.

According to another embodiment, the scanning element is formed on the lower pusher end of a pusher sleeve that can be shifted in a vertical direction along a housing shaft of the pipette housing which has the neck at the lower end. The pusher sleeve is guided very easily and precisely on the housing shaft.

According to another embodiment, the mark is a border of an aperture connected to the upper pusher end. Numbers of the counter can be read from the outside through the aperture and a window of the pipette housing. According to another embodiment, the aperture is adjusted by the pusher such that only the numbers are legible and/or framed by the aperture that display the adjusted pipette volume for the mounted pipette tip, and/or the mark displays the first pre-decimal position and/or the highest post-decimal position. According to another embodiment, the positions of the counter, or respectively the counter rollers are arranged over each other. According to an additional embodiment, the positions of the counter, or respectively the counter rollers are arranged in a horizontal direction next to each other. In this embodiment, the mark is connected by a transmission to the upper pusher end that converts a vertical displacement of the upper pusher end into a horizontal displacement of the mark. According to another embodiment, the mark is a bar-like graduation mark in an aperture frame of the aperture that can be positioned after the smallest pre-decimal position of the counter, and/or in front of the highest post-decimal position of the counter that applies to a clamped pipette tip.

According to another embodiment, the pipette comprises a first spring apparatus with a first contact point on the pipette housing, and a second contact point on the drive apparatus in order to displace the drive element in the first direction when the operating element is released until the first stop element comes into contact with the second stop element.

According to another embodiment, the first spring apparatus is a first helical spring that abuts a first spring bearing on the housing at the bottom end and a second spring bearing on the stroke rod at the upper end. According to another embodiment, the stroke rod is guided through the first helical spring.

According to another embodiment, the operating element is simultaneously the first adjusting element, wherein the operating element is rotatably mounted in the housing and is coupled via a first gearing to the second adjusting element. According to another embodiment, the first gearing comprises a spindle nut, a vertically aligned threaded spindle in threaded engagement with the spindle nut and rotatably coupled to the operating element, and having an elongated bore through which the stroke rod is guided, and a linear guide aligned vertically in the pipette housing on which the spindle nut is guided. In this case, the spindle nut is the second adjusting element, the lower face of the spindle nut is the first stop element, and a bead below the spindle nut projecting radially from the stroke rod is the second stop element. According to another embodiment, the mechanical counter is coupled by a second gearing to the adjusting button or operating button rotatably mounted in the housing.

Another embodiment has a third stop apparatus with a fifth stop element on the pusher, and a sixth stop element on the pipette housing, and a second spring apparatus with a third contact point on the pipette housing, and a fourth contact point on the pusher in order to stress the pusher downward and place the fifth stop element on the sixth stop element when a pipette tip is not mounted on the neck. This holds the pusher in a specific, bottom stop position before a pipette tip is mounted, from which the pusher can be displaced upward by mounting the pipette tip on the neck.

According to another embodiment, the second spring apparatus is a second helical spring that is held at the lower end on a third spring bearing on the pusher, and at the upper end on a fourth spring bearing on the housing. This embodiment is designed simply and is space-saving.

To clamp the plunger rod in the borehole in the stroke rod, the stroke rod can be displaced downward after clamping on the pipette tip by pressing in the operating button until the second stop apparatus takes effect. This can be done directly before drawing the liquid into the pipette tip. For drawing, the user must only release the operating button since the first spring apparatus displaces the stroke rod upward. By again pressing down the operating button, the liquid is released at the pipette tip.

The pipette tip can be removed manually from the pipette. According to another embodiment of the positive displacement pipette, ejection of the pipette tip with the integrated plunger by the operating element is enabled in that the stroke rod has a bottom stroke rod part, the vertical borehole extends to the upper end of the lower stroke rod part, an upper stroke rod part engages in the vertical borehole and a third spring apparatus is integrated in the upper stroke rod part and is configured such that, by pressing the operating element downward, first the upper stroke rod part can be displaced downward concurrently with the lower stroke rod part until the third stop element lies against the fourth stop element and compresses the third spring apparatus upon exerting increased pressure on the operating button so that the upper stroke rod part penetrates deeper into the lower stroke rod part, whereby the plunger rod is pressed out of the vertical borehole, and the pipette tip is pushed off of the neck.

According to a further embodiment, the air cushion pipette has an ejector that enables a release of the pipette tip by actuating the operating element, and/or an additional ejection button. According to another embodiment, the pusher is connected at the top to an ejection button projecting from the upper end of the pipette housing, by the actuation of which the pusher can be displaced downward in order to slip a pipette tip from the neck by the lower pusher end. An ejector is realized thereby by means of the pusher with which pipette tips can be removed from the neck without having to manually touch them.

To remove the integrated plunger from the stroke rod, the removal of the plunger from the pipette tip can be limited by a stop so that the plunger is separated from the stroke rod by slipping off the pipette tips.

Another embodiment comprises a fourth stop apparatus with a seventh stop element on the ejection button, and an eighth stop element on the housing, the fourth stop apparatus being designed to limit the displacement of the ejection button upward, and a transmission apparatus between the ejection button and pusher that is designed to prevent the ejection button from being displaced upward when the pusher is displaced upward, and to displace the pusher concomitantly downward when the ejection button is displaced downward. Consequently, the starting position of the non-actuated ejection button does not change by displacing the pusher upward. As a result, the ejection button does not assume different starting positions upon mounting pipette tips with collars of different heights. Furthermore, the path of the ejection button for slipping off a pipette tip from the neck can be kept constant independent of the pipette tip used. The operating comfort and the visual appearance is improved in comparison to embodiments in which the ejection button and pusher are rigidly connected to each other.

According to another embodiment, (i.) the transmission apparatus is a fourth spring apparatus that has a fifth contact point on the ejection button and a sixth contact point on the pusher, whereby when the pusher is displaced upward, the fourth spring apparatus is compressed, and when the ejection button is displaced downward, initially the fourth spring apparatus is compressed, and then the ejection button entrains the pusher, or (ii.) the transmission apparatus is a locking device arranged between the ejection button and pusher that allows an upward displacement of the pusher relative to the ejection button and prevents a downward displacement of the push button relative to the pusher. According to one preferred embodiment, the locking device is a nonreturn device. With both versions (i.) and (ii.), the upward displacement of the ejection button is limited by the fourth stop apparatus. Accordingly, it assumes a defined upper stop position from which it can be displaced downward.

With version (i.), the ejection button and ejection rod are not rigidly connected to each other but rather by a fourth spring apparatus. The fourth spring apparatus can in particular be a (helical) spring, or a soft elastic element (such as an element consisting of rubber, silicone or a thermoplastic elastomer). The ejection button and pusher are only at a slight distance from each other so that when the ejection button is actuated, initially the fourth spring apparatus is compressed, and when the ejection button lies on the pusher, it is concomitantly displaced downward. On the other hand, an upward movement of the pusher does not lead to an upward movement of the ejection button when a pipette tip is mounted since the fourth stop apparatus prevents this, and only the fourth spring apparatus is compressed.

In version (ii.), the ejection button and the pusher are connected to each other by a locking device. The locking device has the function of preventing the movement of a component in a specific direction, whereas a movement in the opposite direction remains possible. The locking device comprises for example a toothed wheel that is mounted on the ejection button and possesses a freewheel. On one side, the pusher is provided with teeth like a rack. When mounting a pipette tip, the ejector is moved upward, and the toothed wheel rotates freely therewith. When the ejection button is actuated, the free rotation of the toothed wheel is contrastingly stopped, and the pusher is moved concomitantly downward so that the lower pusher end slips the pipette tip off of the neck.

In addition to the pusher, another embodiment comprises an ejection pusher guided in a vertical direction on the pipette housing that is connected to the ejection button at the upper end, and whose lower end is arranged radially offset to the lower end of the pusher next to the neck, wherein (i.) the lower ends of the pusher and ejection pusher are arranged at the same height so that by clamping a pipette tip with two peripheral steps on the upper end onto the neck, the pusher is displaceable by the inner step, and the ejection pusher is not displaceable by the outer step, and by actuating the ejection button, the lower end of the ejection pusher can be pressed against the outer step of the pipette tip in order to slip it off of the neck, or (ii) the lower end of the pusher is arranged lower than the lower end of the ejection pusher so that by clamping a pipette tip with a flat upper edge onto the neck, the pusher is upwardly displaceable, and the ejection pusher is not upwardly displaceable, and by actuating the ejection button, the ejection pusher can be pressed against the upper end of the pipette tip, and the pipette tip can be slipped off of the neck.

In this embodiment, the range adjustment and the ejection of the pipette tip are achieved by a pusher and an ejection pusher separate therefrom. There can be for example an outer and an inner pusher sleeve, wherein the inner pusher sleeve is guided on a shaft of the pipette, and the outer pusher sleeve is guided in the inner pusher sleeve. Whereas the one pusher sleeve is pushed upward when mounting the pipette tip and shifts the range adjustment, the other pusher sleeve is not displaced. This pusher sleeve is only used when actuating the ejection button. This is achieved with version (i.) in that the pipette tip has two concentric peripheral steps on the upper end, wherein the step projecting further upward actuates the range adjustment, and the lower end of the ejection pusher contacts the step that projects less further upward. In version (ii.), this is achieved in that the pusher projects further downward when in an unactuated state than the ejection pusher so that the pusher and not the ejection pusher is displaced by mounting a pipette tip with a flat, upper edge.

According to another embodiment, the attachment has a peripheral shoulder on the outer circumference at a distance from its lower end so that a pipette tip can be clamped onto the attachment by an upper edge of the collar, or a peripheral inner step projecting radially inward on the inner circumference of the collar until the inner step contacts the shoulder. This ensures that the attachment always engages in the clamped-on pipette tip of the particular type to the same depth. If the collar of the pipette tip has a wider section above the inner step and the attachment above the shoulder is not wider as corresponding to the collar, the pipette tip can only be clamped onto the attachment by a seat region below the inner step. Even if the pipette tip can be shoved onto the attachment until the upper edge of the collar contacts the shoulder, it can only be clamped onto the attachment by a seat region below the upper edge of the collar. This allows pipette tips of different types that have collars of different heights to be clamped onto the attachment with the same tightness. This is advantageous for securely clamping pipette tips onto the attachment and releasing the pipette tips from the attachment without exerting excessive force. In embodiments of the pipette tip line explained further below in which the pipette tips can be shoved onto the attachment until the upper edge of the collar or an inner step of the collar contacts the shoulder, the upper edge of the collar or the inner step is termed a “ninth stop element”.

According to another embodiment, the pipette is a single-channel pipette. A single-channel pipette only has a single attachment, for clamping on a pipette tip at the lower end of the housing. According to another embodiment, the pipette is a multichannel pipette. A multichannel pipette is a pipette that has several parallel attachments on the lower end of the pipette housing for simultaneously clamping on several pipette tips. In this embodiment, the scanning apparatus can in particular have a scanning element that is arranged next to only one or next to several necks.

The pipette tip line according to the invention for use with a pipette comprises at least two pipette tips of different types, wherein each pipette tip has a tip opening in the lower end, a collar having a mounting opening with a height at the upper end characteristic of the type of pipette tip, and a seat region on the inner circumference of the collar for clamping onto a neck with a specific contour of a pipette, wherein pipette tips of different types can be clamped by their seat region onto the same clamping zone of the neck so that they project upward with their collar on the neck at different heights.

The collar is the region at the upper end of the pipette tip with which this pipette tip projects upward from the neck, or respectively into which the neck dips when the pipette tip is clamped onto the neck. The height of the collar can be measured starting from the seat region of the pipette tip that for example is formed by a circumferential bead on the inner circumference of the collar. Pipette tips of different types can in fact be clamped by their seat regions onto the same clamping zone of the neck so that the distance of the upper end of the collar from the seat region increases proportionally to the insertion depth of the neck into the collar. With this pipette tip line, pipette tips with collars of different heights control a scanning element of a scanning apparatus of the pipette such that the scanning apparatus adjusts a display of a display apparatus of the pipette depending on the type of pipette tip. Consequently when clamping pipette tips of different types onto the attachment, the display is adjusted so that it indicates the type of each mounted pipette tip. The pipette tips of the pipette tip line can be air cushion pipette tips, or positive displacement pipette tips. Positive displacement pipette tips have a cylindrical plunger travel path on the inside between the tip opening and mounting opening, and an integrated plunger that can be moved along the plunger travel path.

Pipette tips of different types differ in particular with respect to one or more of the following features: nominal volume; shape; dimensions; material (such as PP and/or PE); without or with a coating; without or with surface treatment (such as treatment with a pearl effect for improved streaming-off of detergent-containing liquids); tubes without an inserted filter or with an inserted filter (filter tip); electrically insulating or electrically conductive; degree of purity (such as standard; sterile; protein-free; PCR-free; biologically pure).

According to another embodiment, the pipette tip line comprises at least two pipette tips with different nominal volumes, wherein the pipette tips with different nominal volumes can be clamped by their seat region onto the same neck so that they project by their collar to different heights on the neck. With this pipette tip line, pipette tips with collars of different heights control a scanning element of a scanning apparatus of the pipette such that the scanning apparatus adjusts or retains the volume display of a display apparatus of the pipette depending on the height of the collar. Consequently, when pipette tips with different nominal volumes are clamped onto the attachment, the appropriate volume display is always displayed.

According to one embodiment, the pipette tip line comprises pipette tips whose nominal volumes differ from each other by one or more powers of ten. These pipette tips can be used with a pipette with a mechanical counter in order to adjust a mark of the scanning apparatus next to one of the counter rollers. In this pipette tip line, the heights of the collars differ by the single or integral multiple of the height of a counter roller.

Since the pipette tips of different types can be clamped by their seat region onto the same clamping zone of the same neck, it can be achieved that the pipettes of different types can be clamped onto the neck with the same clamping forces. This is advantageous for an equally secure clamping of pipette tips of different types on the neck. The clamping zone is a continuous zone of the neck running around the neck and free of steps. According to another embodiment, the pipette tips of different types are configured such that they can be clamped exclusively onto the same clamping zone of the neck. In this embodiment, the pipette tips of different types cannot be clamped onto other zones than the clamping zone of the neck, whereby identical clamping forces are achieved. With air cushion pipette tips, this can yield a sealing seat on the neck with identical clamping forces. According to another embodiment, the seat region of the pipette tip contains a peripheral bead and/or a peripheral groove. According to another embodiment, a bead of the seat region of a pipette tip engages in a groove of the clamping region in the neck of the pipette, and/or a bead of the clamping region engages in a groove of the seat region.

According to another embodiment, the difference in height of the collars is the single or integral multiple of the height of a counter roller that is situated within a range of 1 to 7 mm, that is in particular situated within a range of 3 to 5 mm, that preferably is 4.5 mm. In the listed ranges, the numbers of the counter wheels are easily visually detectable while the construction volume is small.

The pipette tips of the pipette tip line according to the invention have a seat region next to the mounting opening on the inner circumference with which they can be clamped onto the neck of a pipette. The seat region is adapted to the contour of at least part of the neck. In this regard, the seat region can either have a contour complementary with the contour (for example a cylindrical or conical contour) of at least part of the neck, or have sealing and/or guide structures projecting on its inner circumference (such as scaling and/or guide beads) that are adapted to the contour (such as a cylindrical or conical contour) of at least part of the neck. The pipette tips with different nominal volumes can be clamped by their seat region onto the same neck so that their collars project upward to different heights on the neck.

According to another embodiment, the clamping to the attachment of a pipette is established by a ninth stop element that prevents the pipette tip from being shoved onto the neck of a pipette by contacting the pipette. The ninth stop element is for example an inner step of the pipette tip running around the inner circumference of the pipette tip and projecting radially inward that comes to rest on the lower end of the neck, or a conical brake region of the pipette tip that tapers downward which comes to rest on the lower end of the neck. The ninth stop element can be formed in the above manner with an air cushion pipette tip as well as with a positive displacement pipette tip. With a positive displacement pipette tip, the ninth stop element, according to another embodiment, is an upper side or a circumferential shoulder of the plunger or the plunger rod that projects radially outward and comes to rest on the stroke rod of the pipette.

According to another embodiment, the ninth stop element is an upper edge of the collar, or an inner step of the pipette tip running around the inner circumference of the collar and projecting radially inward, above which the collar has an expanded section so that the pipette tip can be clamped onto an attachment of a pipette until contacting the upper edge of the collar or the inner step by a seating region arranged below the upper edge of the collar or the inner step until the upper edge of the collar or the inner step lies on a shoulder of the attachment. This embodiment ensures that pipette tips of a specific type can be shoved onto an attachment to the same height. The upper edge of the collar can control the scanning element of a scanning apparatus independent of whether the upper edge of the collar or the inner step lies on the shoulder. According to another embodiment, the pipette tips are designed such that the pipette tips can be clamped onto the attachment only by a seating region below the upper edge of the collar or below the inner step and cannot be clamped onto the attachment by the expanded section of the collar above the inner step. According to another embodiment, the pipette tips are designed so that they can be clamped by their seat region onto a cylindrical or conical section of an attachment below a shoulder of the attachment. According to another embodiment, the pipette tips are designed such that they cannot be clamped onto a cylindrical or conical section of the attachment above the shoulder by an expanded section of the collar above the inner step. According to another embodiment, the expanded section of the collar above the inner step is designed such that there is a gap between the expanded section of the collar and an expanded section of the attachment above the shoulder when the pipette tip is clamped on the attachment. This can allow pipette tips of different types to be clampable on the same attachment with the same tightness. This promotes secure clamping on the attachment and easy removal of the pipette tips from the attachment without excessive force.

According to another embodiment, the seat region extends up to the upper edge of the collar with which the pipette tip can be clamped onto the attachment until contacting the shoulder. According to another embodiment, the seat region extends up to the inner step with which the pipette tip can be clamped onto the attachment until contacting the shoulder.

According to another embodiment, the pipette tip line comprises a pipette tip that is designed to be shovable onto the attachment until the upper edge of the collar contacts a shoulder, and at least one pipette tip of a different type that is designed to be shovable onto the attachment until the inner step contacts a shoulder. According to another embodiment, the pipette tip line comprises at least two pipette tips of different types that are configured to be shovable onto the attachment of a pipette until an inner step contacts a shoulder.

According to another embodiment, each pipette tip has two concentric peripheral steps on the upper edge, wherein one step projects further than the other step relative to the lower syringe opening. These pipette tips are advantageously useful for pipettes in which the ejection button retains the same position independent of the height of the collar of the mounted pipette tip when it is unactuated. According to another embodiment, the pipette tip line comprises pipette tips with at least two of the following nominal volumes: 10 μl; 25 μl; 100 μl; 250 μl; or 1,000 μl. According to another embodiment, the pipette tip line comprises pipette tips with the nominal volumes of 10 μl, 100 μl, and perhaps 1,000 μl or 25 μl, and 250 μl. With these embodiments, it is particularly advantageous that the mechanical display apparatus can change the volume display with pipette tips having different nominal volumes by moving the mark to different decimal places.

The foregoing disclosure describes embodiments of the pipette tip are presented of the pipette tip according to the invention and the pipette tip line according to the invention. An embodiment of a pipette for use with a pipette tip comprises a rod-shaped pipette housing, a neck at the bottom end of the pipette housing for clamping on a pipette tip (70) with a collar having a mounting opening at its upper end, and a drive apparatus. The drive apparatus comprises a drive element for displacing a displacement element for drawing in liquid samples into the pipette tip and ejecting the samples from the pipette tip. An operating element projects from the pipette housing and is displaceable relative to the pipette housing. A scanning apparatus includes a scanning element arranged next to the neck and configured to be displaced by the collar in a longitudinal direction of the neck relative to the pipette housing when clamping a pipette tip onto the neck. A mechanical display apparatus is coupled to the scanning apparatus. The scanning apparatus is configured to adjust a display of the display apparatus depending on the type of pipette tip, when clamping pipette tips onto the neck that differ in type and whose collar has a height characteristic of the type of pipette tip.

In an embodiment of the pipette, the display comprises a volume display. In an embodiment of the pipette, the scanning apparatus includes a pusher displaceably guided on the pipette housing in a vertical direction. The scanning apparatus comprises a scanning element on the lower pusher end, and whose upper pusher end is coupled to the display apparatus.

In an embodiment of the pipette, the pusher bears different nominal volume data one over one another in a vertical direction on an outer side, or different other data, wherein the type of pipette tip, and the pipette housing comprises a window in the displacement region of the nominal volume data or the other data of the pusher, through which only one complete nominal volume datum or one complete other datum on the pusher is visible from the outside.

An embodiment of the pipette comprises a first stop apparatus with a first stop element on the drive apparatus and a second stop element on the pipette housing that can be brought into contact against each other by displacing the drive element in a first direction. The embodiment of the pipette further comprises a second stop apparatus with a third stop element on the drive apparatus and a fourth stop element on the pipette housing configured to be brought into contact against each other by displacing the drive element in a second direction that is opposite the first direction in order to define a measuring stroke of the drive apparatus together with the first stop apparatus.

another embodiment of the pipette comprises an adjusting apparatus with a first adjusting element mounted on the pipette housing, and a second adjusting element on the first or second stop apparatus for adjusting the measuring stroke by adjusting the first adjusting element. The embodiment of the pipette further comprises a mechanical counter coupled to the adjusting apparatus and configured to display the adjustment of the adjusting apparatus. The scanning apparatus is coupled to a mechanical range adjusting apparatus on the counter, whereby when clamping pipette tips with collars of different heights on the upper end onto the neck, the range adjusting apparatus adjusts the counting range of the counter depending on the height of the collar.

In another embodiment of the pipette, the range adjusting apparatus comprises a mark on the upper pusher end arranged on the outside in front of the counter, whereby the pusher can be displaced upward to a varying extent when clamping pipette tips with collars of different heights on the neck in order to position the mark to display different count ranges laterally next to or between different counter rollers of the counter.

In an embodiment of the pipette, the scanning element is formed on the lower pusher end of a pusher sleeve that is configured to be shifted in a vertical direction along a shaft of the pipette housing which has the neck at the lower end. In an embodiment of the pipette, the mark is a bar-like graduation mark (54) of an aperture connected to the upper pusher end.

An embodiment of the pipette further comprises a first spring apparatus with a first contact point on the pipette housing, and a second contact point on the drive apparatus in order to displace the drive element in the first direction when the operating element is released until the first stop element comes into contact with the second stop element.

An embodiment of the pipette further comprising a third stop apparatus with a fifth stop element on the pusher, and a sixth stop element on the pipette housing, and a second spring apparatus with a third contact point on the pipette housing, and a fourth contact point on the pusher configured to stress the pusher downward and place the fifth stop element on the sixth stop element when a pipette tip is not mounted on the neck.

In an embodiment of the pipette, the pusher is connected at the top to an ejection button projecting from the upper end of the pipette housing, by the actuation of which the pusher is configured to be displaced downward in order to slip a pipette tip from the neck by the lower pusher end.

An embodiment of the pipette further comprises a fourth stop apparatus with a seventh stop element on the ejection button, and an eighth stop element on the pipette housing. The fourth stop apparatus is configured to limit the displacement of the ejection button upward. A transmission apparatus is positioned between the ejection button and pusher and is configured to prevent the ejection button from being displaced upward when the pusher is displaced upward, and is configured to displace the pusher concomitantly downward when the ejection button is displaced downward.

In an embodiment of the pipette, the transmission apparatus is a fourth spring apparatus that has a fifth contact point on the ejection button and a sixth contact point on the pusher, whereby when the pusher is displaced upward, the fourth spring apparatus is compressed, and when the ejection button is displaced downward, initially the fourth spring apparatus is compressed, and then the ejection button entrains the pusher or (ii.) wherein the transmission apparatus is a locking device arranged between the ejection button and pusher that allows an upward displacement of the pusher relative to the ejection button and prevents a downward displacement of the ejection button relative to the pusher.

An embodiment of the pipette further comprises an ejection pusher guided in a vertical direction on the pipette housing that is connected to the ejection button at the upper end, and whose lower end is arranged radially offset to the lower end of the pusher next to the neck. Wherein (i.) the lower ends of the pusher and ejection pusher are arranged at the same height so that by clamping a pipette tip with two peripheral steps on the upper end onto the neck, the pusher is displaceable by the inner step, and the ejection pusher is not displaceable by the outer step, and by actuating the ejection button, the lower end of the ejection pusher can be pressed against the outer step of the pipette tip in order to slip it off of the neck, or (ii) the lower end of the pusher is arranged lower than the lower end of the ejection pusher so that by clamping a pipette tip with a flat upper edge onto the neck, the pusher is upwardly displaceable, and the ejection pusher is not upwardly displaceable. By actuating the ejection button, the ejection pusher can be pressed against the upper end of the pipette tip, and the pipette tip can be slipped off of the attachment.

An embodiment of the pipette, the attachment comprises a peripheral shoulder on the outer circumference at a distance from the lower end so that a pipette tip can be shoved on with a peripheral inner step projecting radially inward on the inner circumference of the collar until the inner step contacts the shoulder.

A pipette tip line comprises at least two pipette tips of different types. Each pipette tip comprises a tip opening at the lower end, a collar having a mounting opening with a height at the upper end characteristic of the type of pipette tip, and a seat region on the inner circumference of the collar for clamping onto a neck with a specific contour of a pipette, wherein pipette tips of different types can be clamped by their seat region onto the same neck so that they project upward with their collar on the neck at different heights.

An embodiment of the pipette further comprises at least two pipette tips which differ with respect to one or more of the following features: Nominal volume, shape, dimensions, material, without or with coating, without or with surface treatment, tube without or with an inserted filter, electrically insulating or electrically conductive, and degree of purity. In an embodiment of the pipette tip the difference in height with which the collar of pipette tips with different nominal volumes projects upward on the same neck is the single or integral multiple of the height of a counter roller of a mechanical counter. In an embodiment of the pipette tip, the difference in height is the single or integral multiple of 1 to 7 mm, preferably 3 to 5 mm and preferably 4.5 mm.

In an embodiment of the pipette tip and above the seat region, the collar has an upper edge or a circumferential inner step projecting radially inward on the inner circumference, and the collar has an expanded section above the inner step so that the pipette tip can be shoved onto an attachment until the upper edge or the inner step contacts a shoulder of the attachment.

In an embodiment of the pipette tip line, each pipette tip comprises two concentric peripheral steps on the upper edge, wherein one step projects further upward than the other step relative to the lower tip opening. An embodiment of the pipette tip line further comprises a cylindrical plunger travel region between the tip opening and mounting opening, and a plunger with a plunger rod at the upper end for being clamped in a hole in a stroke rod of a pipette formed as a positive displacement pipette. An embodiment of a pipette system comprises a pipette according to a previously described embodiment, and at least one pipette tip from the previously described embodiments of the pipette tip line.

BRIEF DESCRIPTION OF THE DRAWINGS

The invention will be further explained below with reference to the accompanying drawings of exemplary embodiments of the invention. In the drawings.

DETAILED DESCRIPTION OF THE INVENTION

In the present application, the expressions "upper" and "lower" as well as "vertical" and "horizontal" and terms derived therefrom such as "above" and "below" as well as "over each other" refer to an arrangement of the positive displacement pipette in which the neck is oriented vertically, and is located on the downwardly facing end of the pipette housing. With regard to the pipette tip, these expressions refer to a vertical orientation of the middle axis of the pipette tip, wherein the tip opening is arranged at the bottom, and the mounting opening is arranged at the top.

Figure 1:
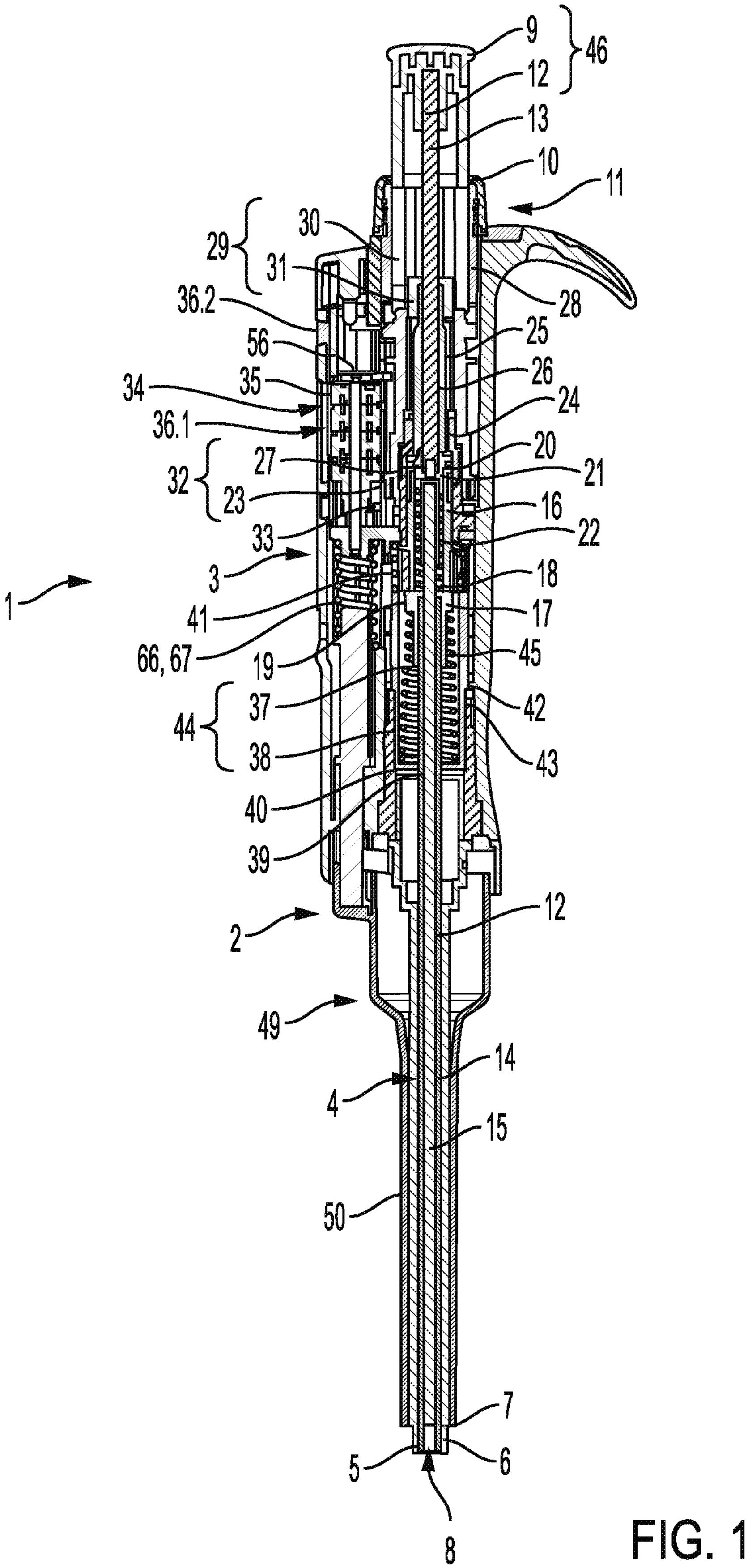
FIG. 1 illustrates a vertical cross-section of an embodiment of a positive displacement pipette in an unactuated state.

According to the embodiment shown in FIG. 1, a pipette 1 is configured as a positive displacement pipette comprising a substantially rod-shaped pipette housing 2 whose upper part is shaped as a handle 3 and whose lower part is shaped as a shaft 4. A neck 5 tapering downward in steps projects from the bottom end of the shaft 4. A first shoulder 6 and above that a second shoulder 7 run around the outer circumference of the neck. From the lower end of the neck 5, a through-channel 8 extends vertically into the pipette housing 2.

An operating element 9 in the form of a sleeve-shaped operating button closed at the top and open at the bottom projects from the upper end of the pipette housing 2. Arranged below the operating element 9 is a first adjusting element 10 in the form of a sleeve-shaped adjusting knob of an adjusting apparatus 11 for adjusting the measuring stroke at the upper end of the pipette housing 2. The operating element 9 can be pressed almost completely vertical into the first adjusting element 10. The lower end of a stroke rod 12 engages from above in the through-channel 8 of the neck 5. The stroke rod extends upward in the pipette housing 2 and is connected to the bottom side of the operating element 9.

The stroke rod 12 comprises an upper stroke rod part 13 and a lower stroke rod part 14. The upper stroke rod part 13 is inserted from above into a vertical first borehole 15 that extends in a longitudinal direction through the entire lower stroke rod part 14 so that the upper stroke rod part 13 can be displaced in the lower stroke rod part 14.

A lower section of a tubular cage 16 is fixed in an upper section of a connecting element 17 in the form of a reducing socket (for example by being screwed in). The lower end of the cage 16 lies against a first projection 18 of the connecting element 17 running around the inner circumference. The lower stroke rod part 14 is fixed in the lower section of the connecting element 17 (for example by being pressed in). The upper section of the connecting element 17 has a larger inner and outer diameter than the lower section, and therebetween, the connecting element 17 has a third shoulder 19 on the outer circumference.

The cage 16 is bordered at the top by a peripheral second projection 20 projecting radially to the inside. The upper stroke rod part 13 is guided through the cage 16 and the connecting element 17. The upper stroke rod part 13 has a peripheral bead 21 that is arranged in the cage 16. A pretensioned first helical spring 22 sits between the bead 21 and the first projection 18 on the upper stroke rod part 13. This presses the bead 21 against the second projection 20.

The upper side of the cage 16 is a first stop element 23. Arranged above that is a spindle nut 24 that is fixed in the pipette housing 2. A threaded spindle 25 engages in the spindle nut 24 and has a second borehole 26 through which the upper stroke rod part 13 is guided. The lower face of the threaded spindle 25 forms a second stop element 27. The spindle nut 24 and the threaded spindle 25 are a component of a first gearing for adjusting the vertical position of the second stop element 27.

The first adjusting element 10 is tightly connected to an adjusting sleeve 28. This is coupled for conjoint rotation to the threaded spindle 25 via a catch apparatus 29 with axially running grooves 30 in the inside of the adjusting sleeve 28 and wings 31 that engage therein and project radially outward, and is coupled to the threaded spindle 25 in a displaceable manner relative to each other in a vertical direction. Consequently by rotating the first adjusting element 10, the axial position of the second stop element 27 can be adjusted in the pipette housing 2 without axially displacing the first adjusting element 10. The first stop element 23 and the second stop element 27 together form a first stop apparatus 32 that limits the upward displacement of the stroke rod 12.

The upper stroke rod part 13 is guided through the spindle nut 24 and is tightly connected to the operating element 9 such that it can be displaced vertically downward by pressing the operating element 9. The adjusting sleeve 28 is coupled at its lower end by a pinion 33 to a mechanical display apparatus in the form of a mechanical counter. Counter rollers 35 of the counter 34 arranged one over the other on a vertical axis of rotation are visible from the outside through a first window 36.1 in a vertical side surface of the pipette housing 2. The lower face of the connecting element 17 is a third stop element 37.

Held below the connecting element 17 in the pipette housing 2 is a pot-shaped fourth stop element 38 that has a central through-hole 39 in its floor 40 through which extends the lower stroke rod part 14. The fourth stop element 38 is securely held by a compensating spring 41 contacting its upper edge and supported in the pipette housing 2 via a flange 42 running on its outer circumference on a fourth shoulder 43 in the pipette housing 2. The third stop element 37 and the fourth stop element 38 together form a second stop apparatus 44 that limits the downward displacement of the lower stroke rod part 14.

A first spring apparatus 45 in the form of a conical spring has a first contact point in the pipette housing 2 on the upper side of the floor 40 and a second contact point on the third shoulder 19 of the connecting element 17 in order to displace the cage 16 upward when the operating button 9 is released until contacting the first stop apparatus 32. The stroke rod 12 and the operating button 9 are part of a drive apparatus 46 for a plunger.

Figure 4C:
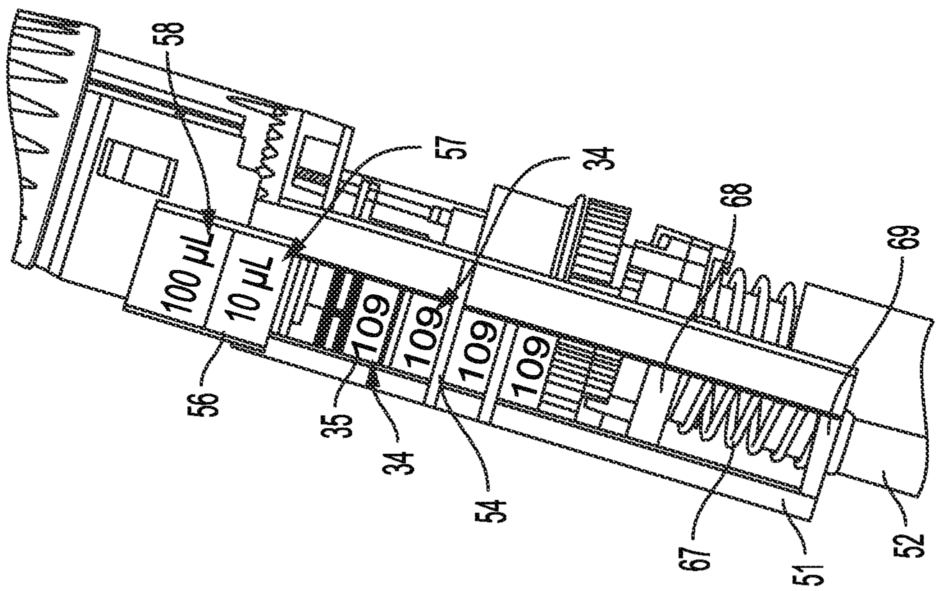
FIG. 4*c* illustrates an enlarged view of the embodiment of the positive displacement pipette of FIG. 4*a;*
Figure 4B:
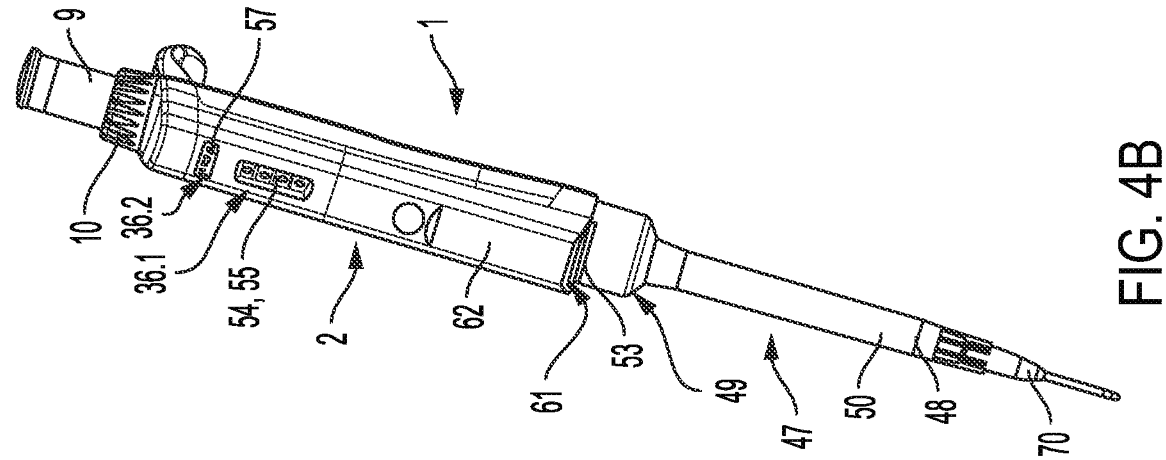
FIG. 4*b* illustrates a perspective side view of the embodiment of the positive displacement pipette of FIG. 4*a* with a housing and with a housing.
Figure 4A:
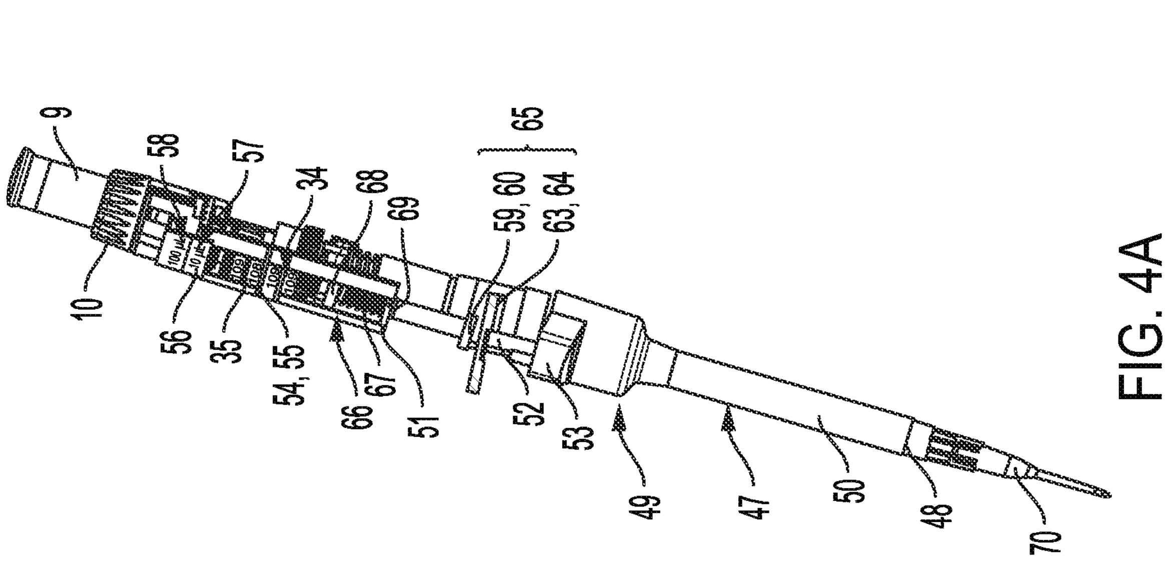
FIG. 4*a* illustrates a perspective side view of the embodiment of the positive displacement pipette of FIG. 1 with a mounted 10 μL pipette tip and without a housing.
Figure 5C:
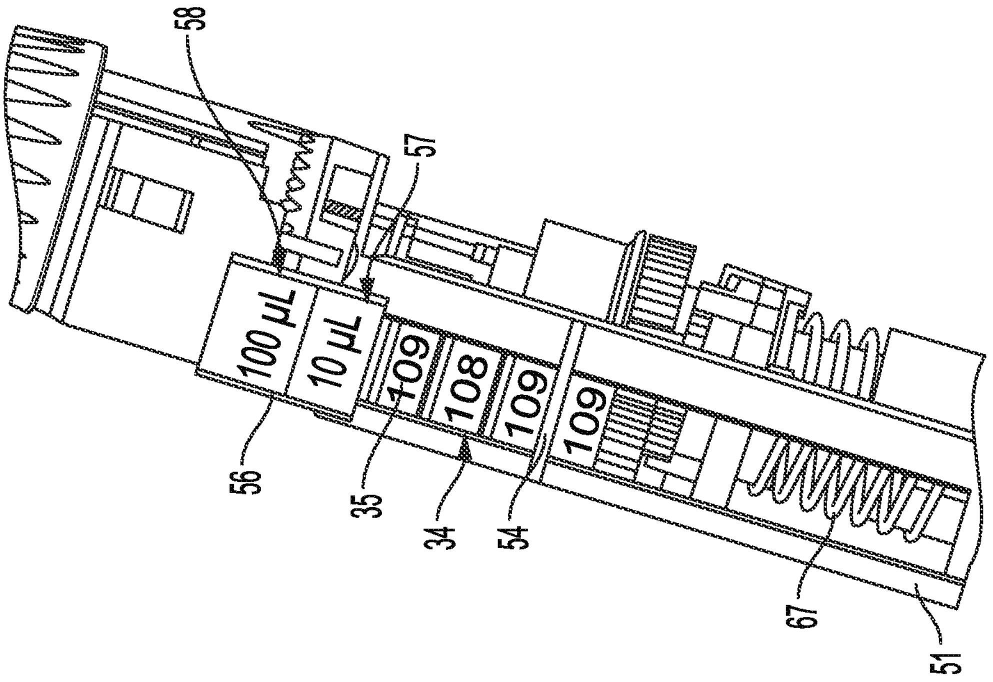
FIG. 5*c* illustrates an enlarged perspective side view of the embodiment of FIG. 3*a;*
Figure 5B:
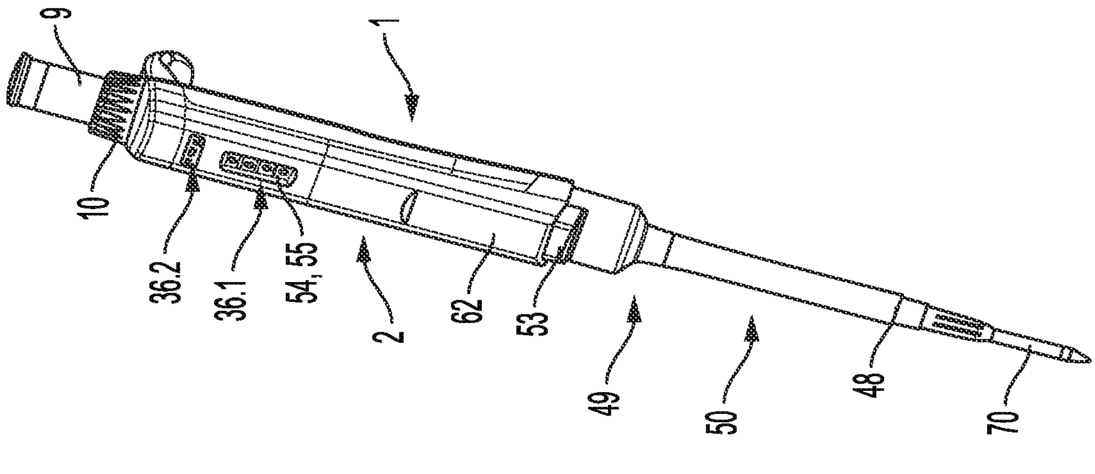
FIG. 5*b* illustrates a perspective side view of the embodiment of the positive displacement pipette of FIG. 5*b* with a housing.
Figure 5A:
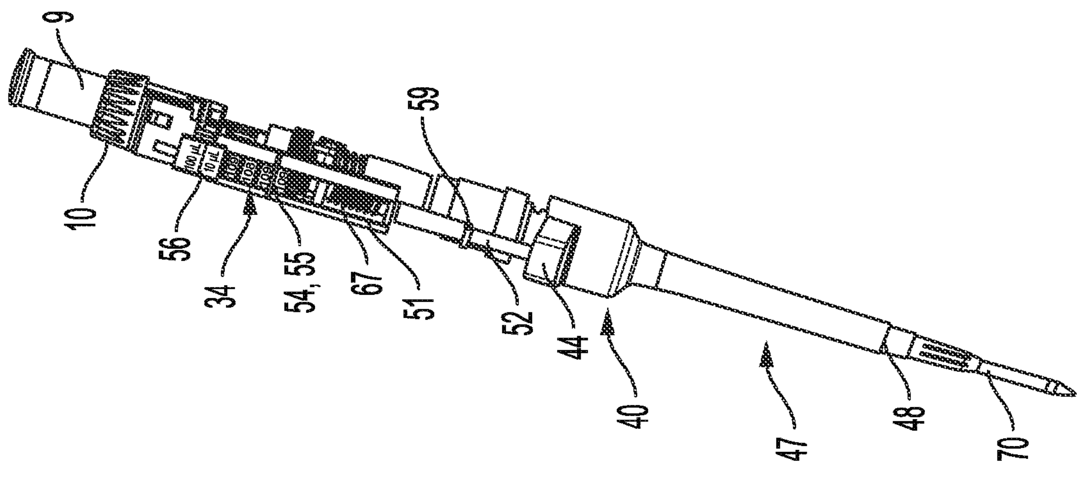
FIG. 5*a* illustrates a perspective side view of the embodiment of the positive displacement pipette of FIG. 1 with a mounted 100 μL pipette tip and without a housing.

According to FIGS. 4 and 5, a scanning apparatus 47 is mounted on the pipette housing 2. The former has a scanning element 48 that is formed by the lower end of a pusher 49. At the bottom, the pusher 49 has a pusher sleeve 50 guided on the shaft 4 and an aperture 51 at the top. The pusher sleeve 50 and the aperture 51 are connected to each other by a rod 52. The rod 52 is fixed at the bottom in a protrusion 53 projecting at the side from the pusher sleeve 50. A bar-like graduation mark 54 of the aperture 51 forms a mark 55 that can be adjusted after the lowest pre-decimal position and/or in front of the highest post-decimal position of the counter 34.

On the inside of the pipette housing 2, the aperture 51 is arranged on the outside in front of the counter 34 so that the graduation mark 54 is visible from the outside through the first window 36.1 of the pipette housing 2 that is covered by a transparent pane. At the upper end of the aperture 51 is a tab 56 in which several different nominal volume data 57, 58 are arranged one over the other. A nominal volume datum 57, 58 can be seen from the outside through a second window 36.2 of the pipette housing 2 which is covered by transparent pane. The rod 52 of the pusher 49 bears a radially projecting disk 59 that forms a fifth stop element 60.

The protrusion 53 is arranged through a duct opening 61 at the lower end of a duct 62 arranged on the side of the pipette housing 2. Within the duct 62, the rod 52 is guided through a hole in a horizontal partition wall 63 of the pipette housing 2. The upper side of the partition wall 63 (also noted in FIG. 4) is a sixth stop element 64 that limits the downward displacement of the pusher 49 by contacting the fifth stop element 60. The fifth stop element 60 and sixth stop element 64 jointly form a third stop apparatus 65.

A second spring apparatus 66 in the form of a second helical spring 67 is braced at the top against a third contact point on a holder 68 of the pipette housing 2 for the counter 34, and at the bottom against a fourth contact point on a horizontal frame part 69 of the aperture 51. The second helical spring 67 is under pretension in order to keep the fifth stop element 60 in contact with the sixth stop element 64.

Figure 2:
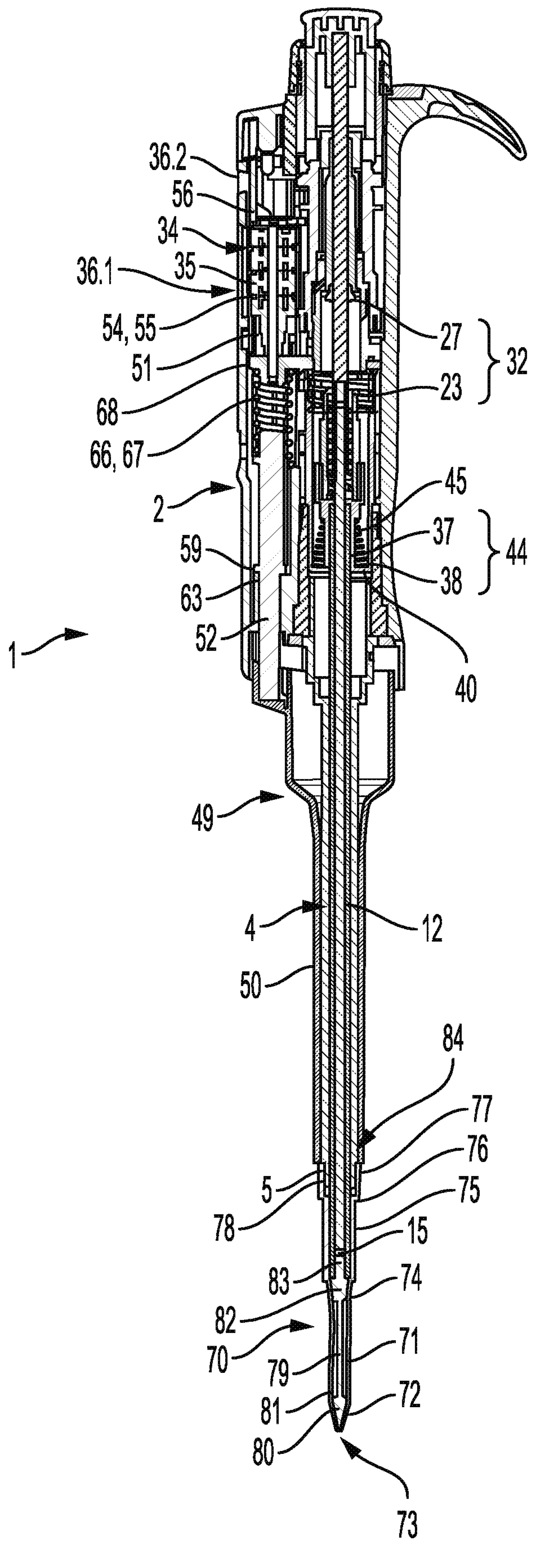
FIG. 2 illustrates a vertical cross-section of the embodiment of the positive displacement pipette of FIG. 1 with a pipette tip that is clamped and coupled to the drive apparatus.
Figure 3:
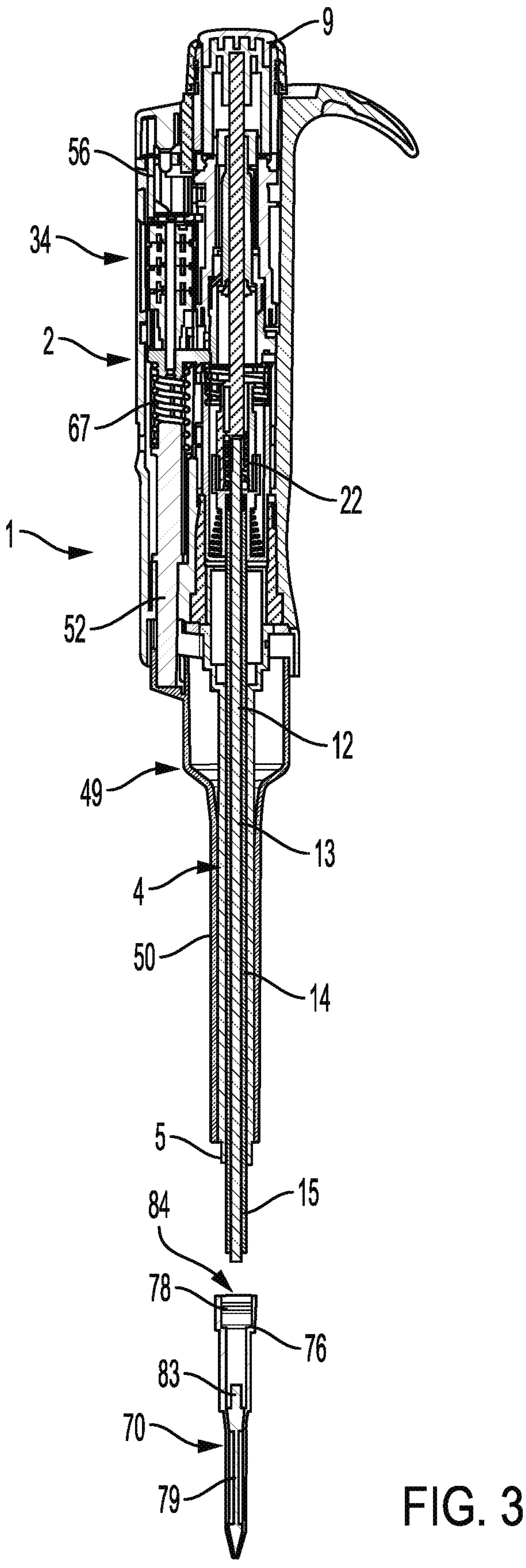
FIG. 3 illustrates a vertical cross-section of the embodiment of the positive displacement pipette of FIG. 1 when ejecting a pipette tip.

According to FIGS. 2 and 3, a pipette tip 70 has a cylindrical plunger travel region 71. At the lower end of the cylindrical plunger travel region 71, there is a conical initial section 72. The tip opening 73 is arranged centrally in the lower end of the initial section 72. The plunger travel region 71 is connected at the top to a conical transition region 74 which adjoins a cylindrical connecting region 75. The cylindrical connecting region 75 is connected by an expansion 76 to a collar 77. The collar 77 has an upwardly expanding, slightly conical shape. On the inner circumference, it has a peripheral bead 78 that belongs to a seat region 78.1 or forms it.

A plunger 79 is arranged in the pipette tip 70. The former has a conical plunger section 80 that can be inserted into the cylindrical plunger travel region 71. At the upper end, the plunger section 80 is sealed by a sealing edge 81 against the plunger travel region 71. At the bottom, the plunger section 80 can be inserted into the conical initial section 72 of the pipette tip 70. At the top, the plunger section 80 is connected to a conical connecting section 82 that can be inserted into the transition region 74. A short plunger rod 83 extends upward from the transition region 74.

Pipette tips 70 with different nominal volumes have cylindrical plunger travel regions 71 and corresponding conical plunger sections 80 with different cross-sections. Moreover, they differ in that the collar 77 has a different height relative to the scat region 78.1. The mounting opening 84 for the pipette tip 70 is located at the upper end of the collar 77.

According to FIGS. 2 and 4 to 7, a pipette 1 is inserted with the neck 5 into the mounting opening 84 of a pipette tip 70 with an integrated plunger 79. When mounting the pipette tip 70 on the neck 5, an inner step 76.1 within the collar 77 (see FIG. 9) or the upper edge of the collar 77 (see FIG. 10)

contacts the second shoulder 7. In both embodiments, the bead 78 lies below the first shoulder 6 under pretension similarly on the collar 77 so that the pipette tip 70 is securely clamped on the neck 5. In this case, the bead 78 and therefore the seat region 78.1 in both embodiments lie sealingly against the same clamping zone 5.1 of the collar 5.

Figure 8:
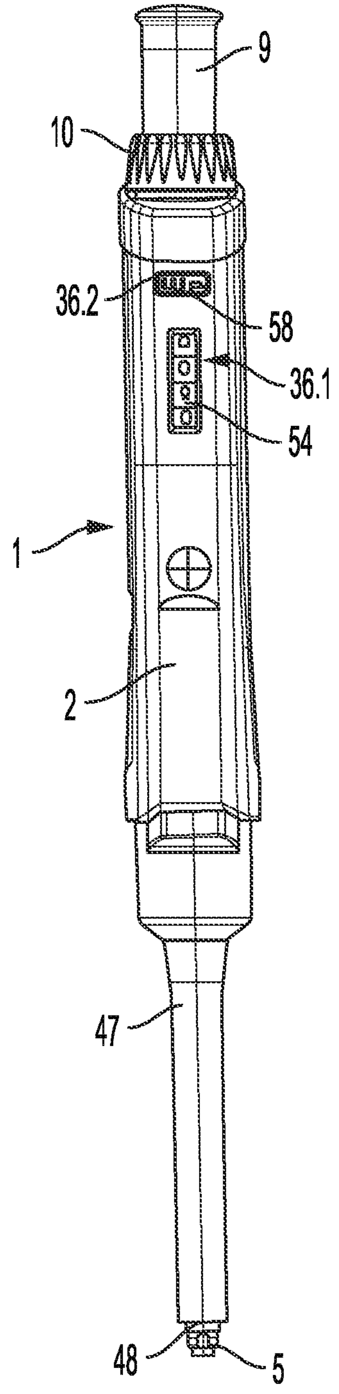
FIG. 8 illustrates a perspective view of an embodiment of the positive displacement pipette without a mounted pipette tip.

When the upper edge of the collar 77 contacts the second shoulder 7, the pusher 49 is not moved, and the display of the mechanical counter 34 remains unchanged. This is the case when mounting the 100 mL pipette tip that is shown in FIGS. 2, 5, 7 and 10. The display is the same as in FIG. 8 that shows the pipette without a mounted pipette tip 70. The graduation mark 54 shows the user the lowest pre-decimal position or the highest post-decimal position.

Figure 6:
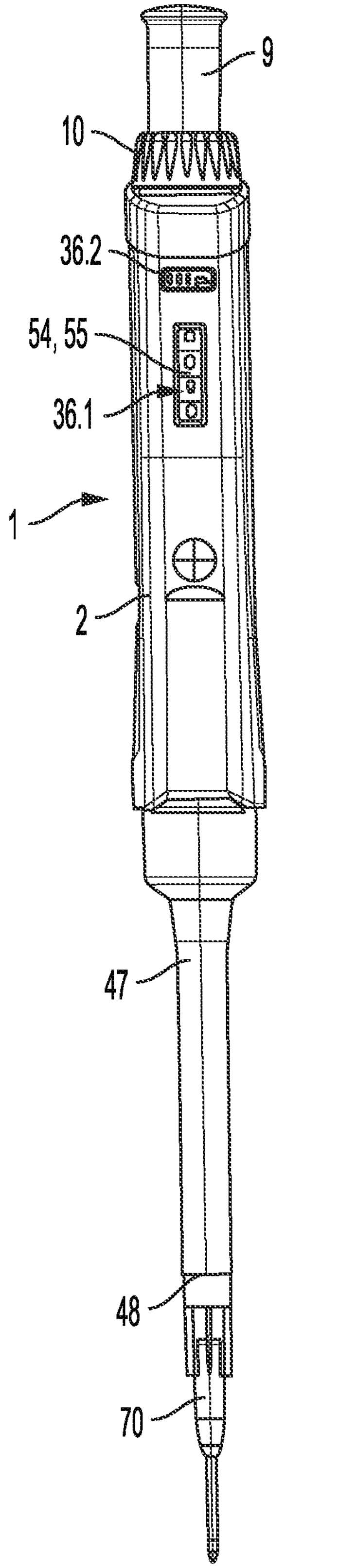
FIG. 6 illustrates a perspective view of an embodiment of the positive displacement pipette with a mounted pipette tip with a nominal volume of 10 mL.
Figure 7:
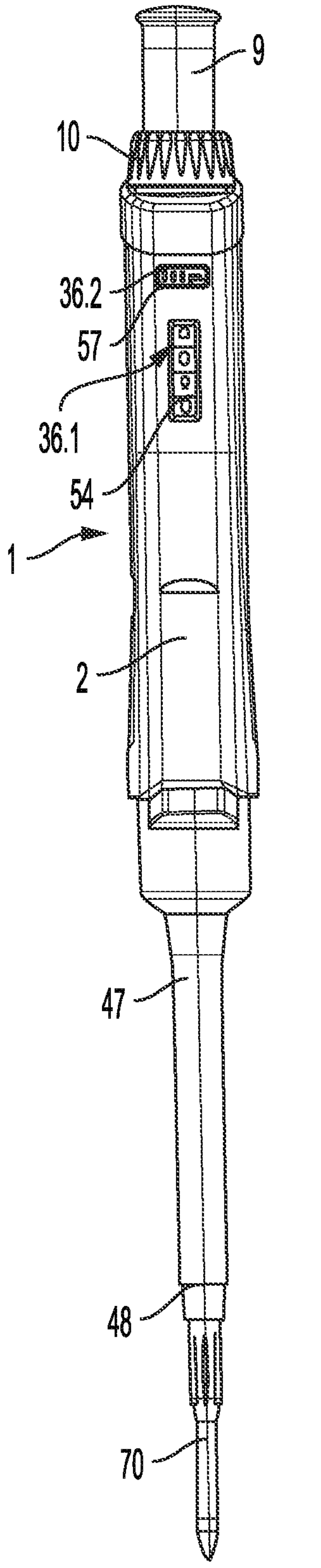
FIG. 7 illustrates a perspective view of an embodiment of the positive displacement pipette with a mounted pipette tip with a nominal volume of 100 μl.
Figure 9:
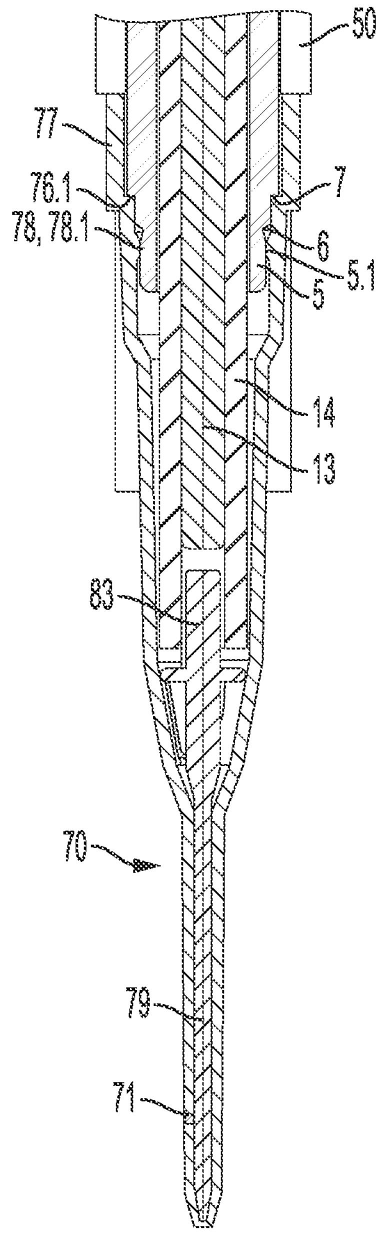
FIG. 9 illustrates a cross-sectional view of an embodiment of a shaft of an embodiment of the positive displacement pipette with a mounted pipette tip having a nominal volume of 10 mL.
Figure 10:
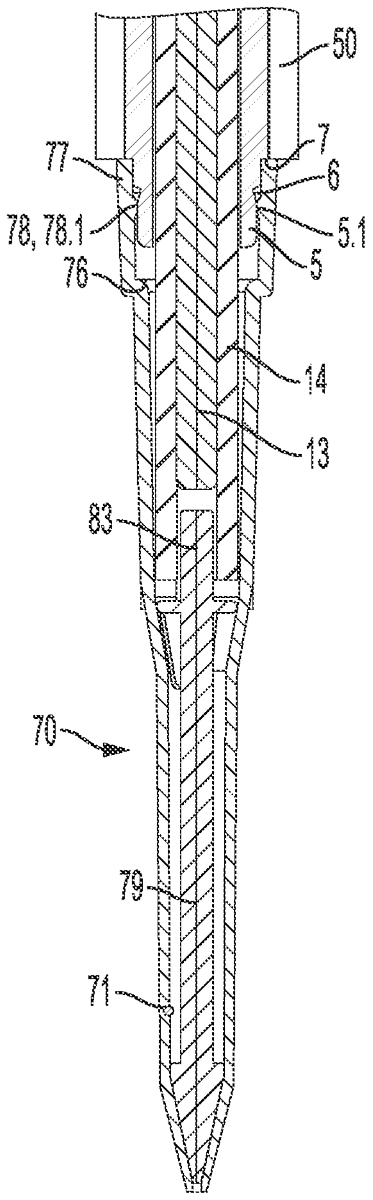
FIG. 10 illustrates a cross-sectional view of an embodiment of a shaft of an embodiment of the positive displacement pipette with a mounted pipette tip having a nominal volume of 100 μL.

When the inner step 76.1 contacts the second shoulder 7, the upper edge of the collar 77 projecting beyond the inner step 76.1 contacts the lower end of the pusher 49 and moves it upward counter to the effect of the second helical spring 67. In this case, the aperture 51 is displaced so that the graduation mark 54 is shoved into a different position between two counter rollers 35 of the counter 34. This is the case when mounting the 10 mL pipette tip 1 that is shown in FIGS. 4, 6 and 9. The displacement of the graduation mark 54 depends on the height of the collar 77. Depending on the nominal volume of the pipette tip 70, the graduation mark 54 is therefore adjusted next to a specific position of the counter 34. In addition, the user is shown the particular nominal volume datum 57, 58 of the mounted pipette tip 70 in the second window 36.2.

In the following, pipetting with the pipette 1 will be explained. The plunger rod 83 is connected to the stroke rod 12 by pressing down the operating element 9 until contacting the second stop apparatus 44. In this case, the plunger rod 83 is clamped in the first borehole 15 in the stroke rod 12. This is shown in FIG. 2.

Then, when the operating element 9 is pressed down, the lower end of the pipette tip 70 can be immersed in a liquid in a vessel. When the operating element 9 is released, the stroke rod 12, and therefore the plunger 79, is displaced upward by the first spring apparatus 45 until contacting the first stop apparatus 32, and liquid is drawn into the pipette tip 70.

To discharge the drawn volume of liquid, the lower end of the pipette tip 70 is inserted into another container, and the liquid is discharged by pressing down the operating element 9 until contacting the second stop apparatus 44. In so doing, the plunger 79 is moved into its lowest position in the pipette tip 70, and the liquid volume is displaced through the tip opening 73 into the container.

According to FIG. 3, the operating element 9 is pressed down further to release the pipette tip 70 so that the first helical spring 22 is compressed, and the upper stroke rod part 13 presses the plunger rod 83 out of the first borehole 15.

Given a pipette 1 designed as an air cushion pipette, the stroke rod 12 is coupled to a plunger that is displaceable in a cylinder arranged in the pipette housing 2 by actuating the operating element 9. The cylinder is connected via a channel to a hole in the lower end of the neck 5.

As with the positive displacement pipette, the scanning apparatus 47 can be configured such that it has a scanning element 48 on the lower end of a pusher 49 that has a pusher sleeve 50 guided on the shaft 4. The pusher 49 is coupled at the top to a mark 55 for adjusting on the side next to a counter roller 35 of a counter 34 and, if applicable, to a tab 56 for displaying various nominal volume data 57, 58 in a window.

The pusher 49 can also be used to eject the pipette tip 70. To accomplish this, the pusher 49 according to FIG. 9 is coupled to an ejection button 85 that projects outwardly out of the pipette housing 2. In principle, the ejection button 85 can be rigidly connected to the pusher 49. However, this has the consequence that the position of the ejection button 85 depends on the height of the collar 77 of the mounted pipette tip 70.

Figure 11:
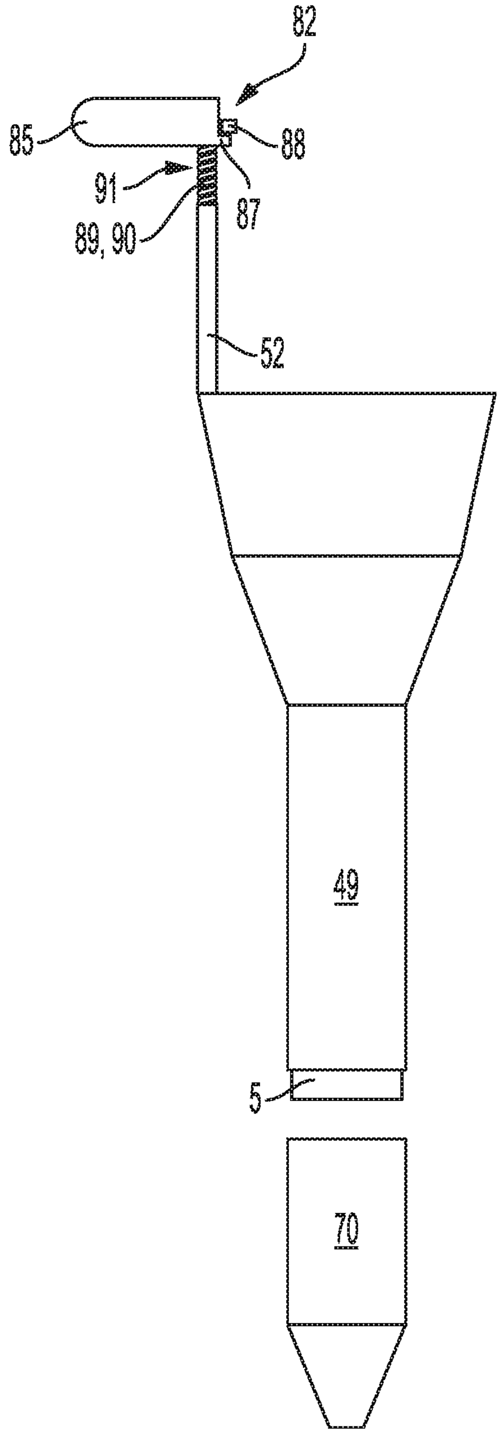
FIG. 11 illustrates a schematic representation of an embodiment of a transmission apparatus including a spring positioned between the ejection button and ejection pusher of an embodiment of an air cushion pipette.
Figure 12:
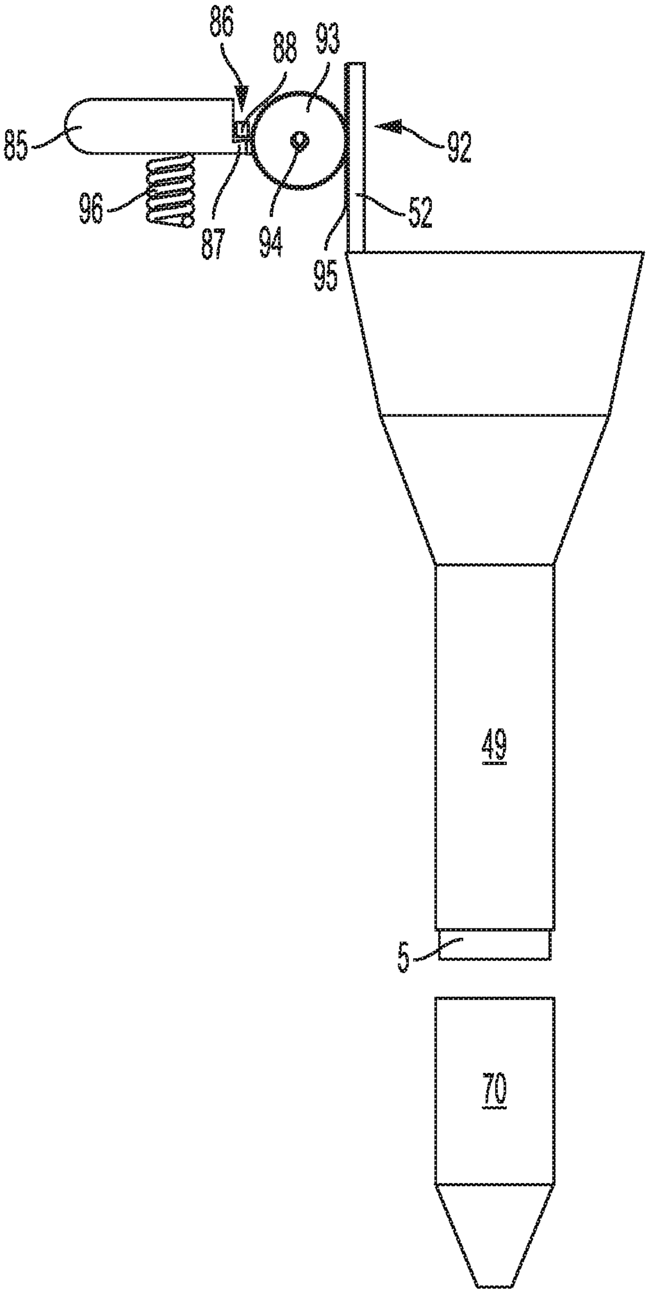
FIG. 12 illustrates a schematic representation of an embodiment of a gearing apparatus including a locking device positioned between the ejection button and pusher of an embodiment of an air cushion pipette.
Figure 13:
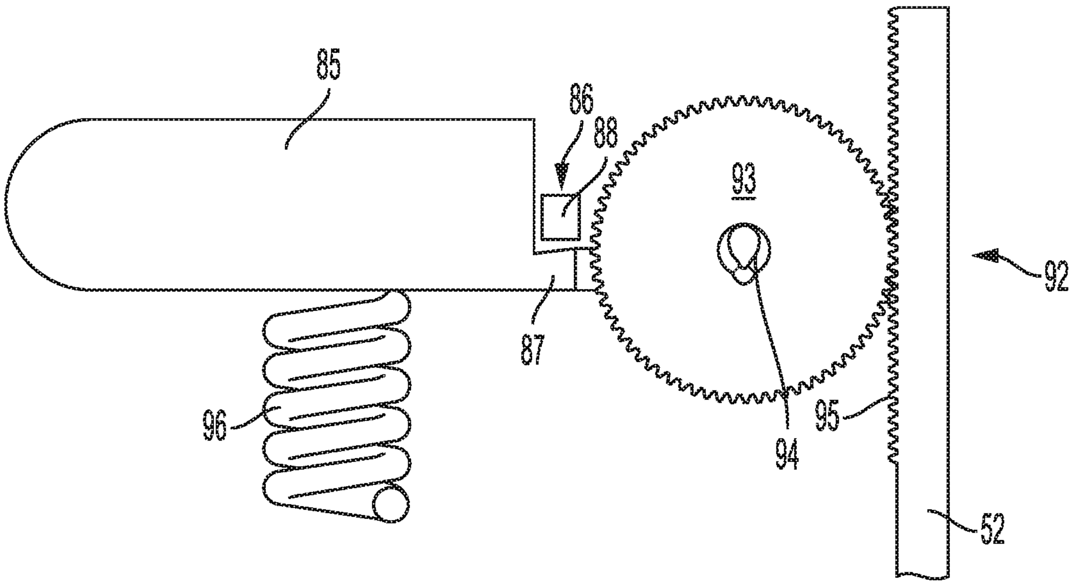
FIG. 13 illustrates a schematic representation of the embodiment of FIG. 12.

In the exemplary embodiments in FIGS. 11 to 13, this is prevented by providing a fourth stop apparatus 86 with a seventh stop element 87 on the ejection button 85 and an eight stop element 88 on the pipette housing 2 that limit an upward displacement of the ejection button 85. In addition, there is a transmission apparatus 89 between the ejection button 85 and pusher 49 that, when the pusher 49 is displaced upward, does not displace the ejection button 85 upward and entrains the pusher 49 downward when the ejection button 85 is displaced downward. According to FIG. 11, the transmission apparatus 89 is a fourth spring apparatus 90 between the ejection button 85 and rod 52 of the pusher 49 that is designed as a third helical spring 91.

The fourth spring apparatus 90 is under pretension so that when the ejection button 85 is not pressed down, the fourth stop apparatus 86 takes effect. When a pipette tip 70 is mounted, the pusher 49 is displaced upward, and the fourth spring apparatus 90 is compressed. The ejection button 85 remains in its upper stop position. When the ejection button 85 is actuated, first the fourth spring apparatus 90 is compressed further. Then the ejection button 85 presses against the rod 52 of the pusher 49, whereby it slips the pipette tip 70 off of the neck 5. According to FIGS. 12 and 13, the transmission apparatus 89 comprises a locking device 92 arranged between the ejection button 85 and pusher 49. In this case, it is a toothed wheel 93 that is rotatably mounted on the ejection button 85 and possesses a freewheel 94. The rod 52 has a toothed rack 95 on one side which engages with the toothed wheel 93.

When the ejection button 85 is not actuated, the fourth stop apparatus 86 takes effect due to a fifth spring apparatus 96 acting thereupon. When a pipette tip 70 is mounted, the pusher 49 is displaced upward, wherein the toothed wheel 93 rotates freely therewith. Only when the ejection button 85 is actuated, the free rotation of the toothed wheel 93 is stopped, and the rod 52 is moved downward therewith. Consequently, the pusher 49 presses the pipette tip 70 off of the neck 5.

Figure 14:
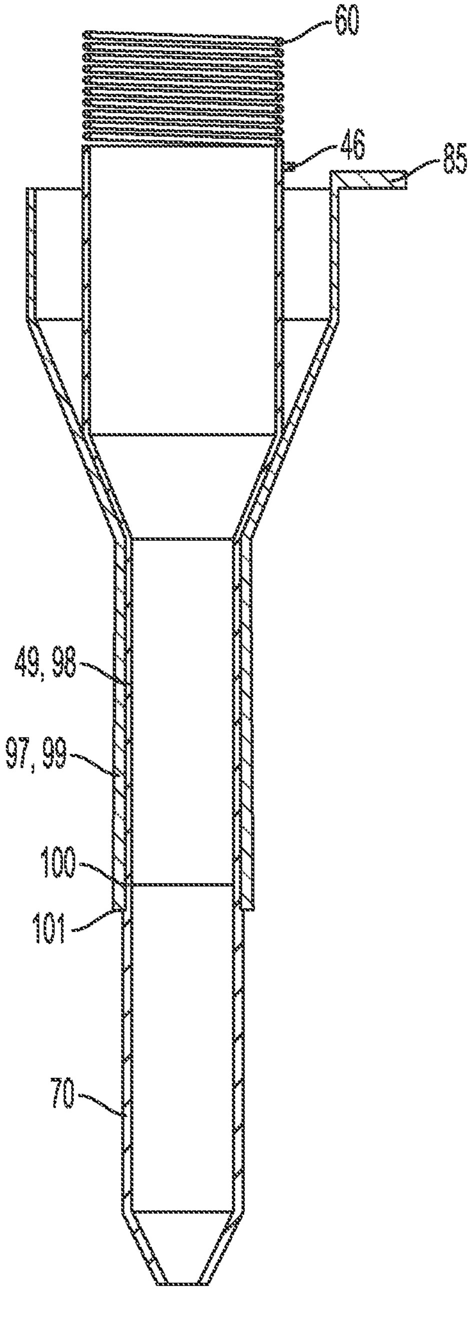
FIG. 14 illustrates a schematic representation of an embodiment of an air cushion pipette comprising a separate scanning apparatus and ejection apparatus, and a pipette tip with steps at the upper end.

According to FIG. 14, a displacement of the ejection button 85 when the pipette tip 70 is being mounted is prevented in that there is an ejection pusher 97 in addition to the pusher 49. At the lower end, the pusher 49 has an inner pusher sleeve 98 guided on the shaft, and the ejection pusher 97 has an outer pusher sleeve 99 guided on the inner pusher sleeve 98 on the lower end.

At the upper edge, the pipette tip 70 has two concentric peripheral steps 100, 101, wherein the inner step 100 projects further upward in a vertical direction than the outer step 101. When mounting the pipette tip 70, the inner step 100 actuates the pusher 49, which adjusts the graduation mark 54 on the mechanical counter 34. The ejection pusher 97 is not actuated by the outer step 101. When pressing down the ejection button 85, the lower end of the ejection pusher 97 contacts the outer step 101 and presses the pipette tip 70 off of the neck 5.

Figure 15:
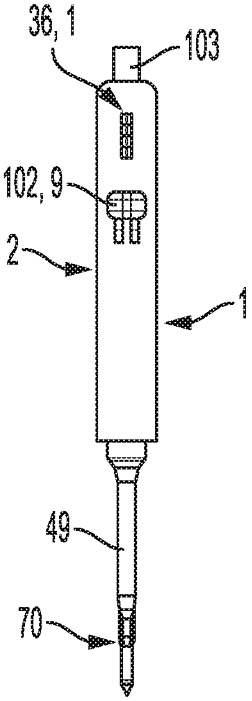
FIG. 15 illustrates a front plan view of an embodiment of a positive displacement pipette with an operating lever and switching apparatus for displacing the plunger in both directions.
Figure 16:
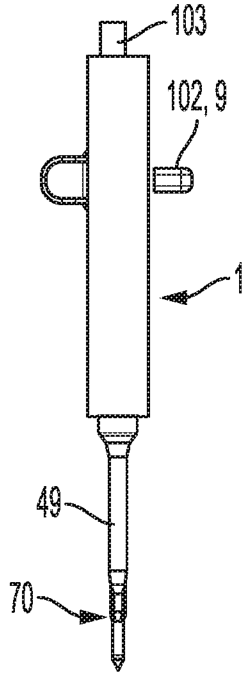
FIG. 16 illustrates a side plan view of the embodiment of a positive displacement pipette of FIG. 15.
Figure 17:
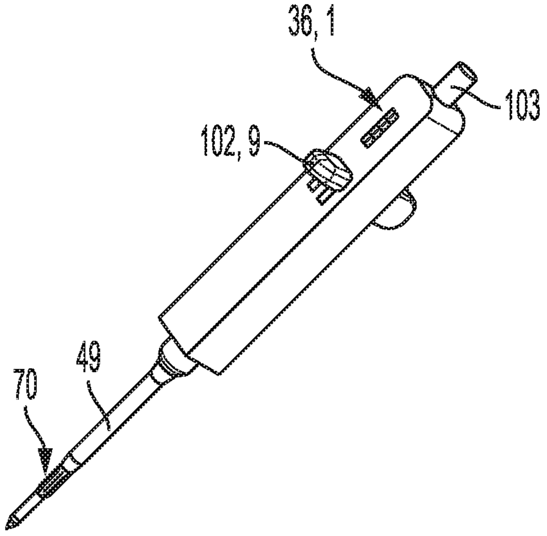
FIG. 17 illustrates a perspective front view of the embodiment of a positive displacement pipette of FIG. 15.

According to FIGS. 15 to 17, a pipette 1 is a positive displacement pipette and comprises a pipette housing 2 with an operating element 9 on a vertical side surface designed as an operating lever 102 that can be swung vertically upward and downward, and a first adjusting element 10 designed as a knob 103 for adjusting a volume on the upper end. At the bottom, a positive displacement pipette tip 70 can be clamped onto the neck 5.

By pressing the operating lever 102 downward one or several times, an adjusted volume can be drawn into the pipette tip 70. A spring is arranged in the pipette housing 2 that is compressed downward by pressing the operating lever 102 downward, and swings the operating lever 102 upward after releasing. The length of movement of the operating lever 102 and/or the number of its actuations depend on the adjusted volume. Furthermore the drawn liquid can be dispensed from the pipette tip 70 by swinging the operating lever 102 downward one or more times. The actuation, or respectively the number of actuations also depends on the adjusted volume.

To control both the drawing in of the liquid into the pipette tip 70 as well as the discharge of the liquid out of the pipette tip 70 by swinging the operating lever 102 downward, the drive apparatus of the pipette 1 has a switching apparatus that reverses the direction of displacement of the plunger 79 by actuating the operating lever 102 after drawing in the adjusted volume into the pipette tip 70. As a consequence, the ejection of the drawn liquid out of the pipette tip 70 is brought about by further actuating the operating lever 102.

LIST OF REFERENCE NUMBERS

1 Pipette
2 Pipette housing
3 Handle
4 Shaft
5 Neck
5.1 Clamping zone
6 First shoulder
7 Second shoulder
8 Through-channel
9 Operating element
10 First adjusting element
11 Adjusting apparatus
12 Stroke rod
13 Upper stroke rod part
14 Lower stroke rod part
15 First borehole
16 Cage
17 Connecting element
18 First projection
19 Third shoulder
20 Second projection
21 Bead
22 First helical spring
23 First stop element
24 Spindle nut
25 Threaded spindle
26 Second borehole
27 Second stop element
28 Adjusting sleeve
29 Catch apparatus
30 Groove
31 Wing
32 First stop apparatus
33 Pinion
34 Mechanical counter
35 Counter roller
36.1 First window
36.2 Second window
37 Third stop element
38 Fourth stop element
39 Through-hole
40 Floor
41 Compensation spring
42 Flange
43 Fourth shoulder
44 Second stop apparatus
45 First spring apparatus
46 Drive apparatus
47 Scanning apparatus
48 Scanning element
49 Pusher
50 Pusher sleeve
51 Aperture
52 Rod
53 Protrusion
54 Graduation mark
55 Mark
56 Tab
57 Nominal volume datum
58 Nominal volume datum
59 Pane
60 Fifth stop element
61 Duct opening
62 Duct
63 Partition wall
64 Sixth stop element
65 Third stop apparatus
66 Second spring apparatus
67 Second helical spring
68 Holder
69 Frame part
70 Pipette tip
71 Plunger travel region
72 Conical initial section
73 Tip opening
74 Conical transition region
75 Cylindrical connecting region
76 Expansion
76.1 Inner step
77 Collar
78 Bead
78.1 Seat region
79 Plunger
80 Conical plunger section
81 Sealing edge
82 Conical connecting section
83 Plunger rod
84 Mounting opening
85 Ejection button
86 Fourth stop apparatus
87 Seventh stop element
88 Eighth stop element
89 Transmission apparatus
90 Fourth spring apparatus
91 Third helical spring
92 Locking device
93 Toothed wheel
94 Freewheel
95 Toothed rack
96 Fifth spring apparatus
97 Ejection pusher
98 Inner pusher sleeve
99 Outer pusher sleeve
100 Inner step
101 Outer step
102 Operating lever

103 Knob

The invention claimed is:

1. A pipette for use with a pipette tip, the pipette comprising:

a pipette housing comprising a top end and a bottom end;

a neck positioned at the bottom end of the pipette housing and configured to clamp on the pipette tip, wherein the pipette tip includes a collar at an upper end that defines a mounting opening;

a drive apparatus comprising, a drive element configured to displace a displacement element to draw a liquid sample into the pipette tip and to eject the liquid sample from the pipette tip, and an operating element projecting from the pipette housing and configured to be displaced relative to the pipette housing;

a scanning apparatus comprising a scanning element positioned proximate the neck and configured to be displaced relative to the pipette housing by the collar of the pipette tip when clamping the pipette tip onto the neck;

a mechanical display apparatus coupled to the scanning apparatus and comprising a display;

a first stop apparatus comprising, a first stop element positioned on the drive apparatus, and a second stop element positioned on the pipette housing, wherein displacement of the drive element in a first direction is configured to bring the first stop element and the second stop element into contact with each other;

a second stop apparatus comprising, a third stop element positioned on the drive apparatus, and a fourth stop element positioned on the pipette housing, wherein displacement of the drive element in a second direction is configured to bring the third stop element and the fourth stop element into contact with each other, wherein the second direction is different from the first direction;

wherein contact of the first stop element with the second stop element and contact with the third stop element with the fourth stop element define a measuring stroke of the drive apparatus an adjusting apparatus comprising, a first adjusting element mounted on the pipette housing, and a second adjusting element positioned on one of the first stop apparatus and the second stop apparatus, wherein the second adjusting element is configured to adjust the measuring stroke by adjusting the first adjusting element; and a mechanical counter coupled to the adjusting apparatus and comprising a mechanical range adjusting apparatus, wherein the mechanical counter is configured to display an adjustment of the adjusting apparatus, wherein when the pipette tip is clamped to the neck, the scanning apparatus is configured to adjust the display depending on a height of the collar of the pipette tip relative to the neck, and wherein the neck is configured to accommodate different collar heights, wherein the scanning apparatus is coupled to the mechanical range adjusting apparatus, and wherein the mechanical range adjusting apparatus is configured to adjust a count range of the mechanical counter depending on a position of the scanning element relative to the pipette housing.

2. The pipette according to claim 1, wherein the mechanical display apparatus is a volume display.

3. The pipette according to claim 1, further comprising a first spring apparatus configured to contact the pipette housing and the drive apparatus.

4. The pipette according to claim 1, wherein the scanning apparatus comprises a pusher including a lower pusher end and an upper pusher end, wherein the pusher is configured to be displaced relative to the pipette housing, and wherein the scanning element is positioned at the lower pusher end and the upper pusher end is coupled to the mechanical display apparatus.

5. The pipette according to claim 4, wherein the pusher comprises at least one of nominal volume data and data characterizing a type of the pipette tip, and wherein the pipette housing defines an opening through which at least the nominal volume data is visible from an outside of the pipette housing.

6. The pipette according to claim 4, wherein the range adjusting apparatus comprises a mark on the upper pusher end positioned in front of the mechanical counter, wherein the pusher is configured to be displaced upward when clamping pipette tips of varying collar heights in order to position the mark to display different count ranges.

7. The pipette according to claim 6, wherein the scanning element is positioned on the lower pusher end and is configured to be shifted in a vertical direction along the pipette housing.

8. The pipette according to claim 7, wherein the mark is a graduation mark.

9. The pipette according to claim 4, further comprising:

a third stop apparatus comprising, a fifth stop element positioned on the pusher, and a sixth stop element positioned on the pipette housing; and a second spring apparatus configured to contact the pipette housing and the pusher, wherein the second spring apparatus is configured to stress the pusher downward and place the fifth stop element on the sixth stop element when the pipette tip is not mounted on the neck.

10. The pipette according to claim 9, further comprising an ejection pusher comprising an upper end and a lower end, wherein the ejection pusher is configured to be guided in a vertical direction along the pipette housing, wherein the upper end of the ejection pusher is connected to an ejection button and the lower end of the ejection pusher is radially offset to the lower end of the pusher, wherein the lower end of the pusher and the lower end of the ejection pusher are positioned at a same height, wherein clamping the pipette tip including an inner peripheral step and an outer peripheral step onto the neck displaces the pusher via the inner peripheral step, and wherein actuation of the ejection button is configured to press the lower end of the ejection pusher against the outer peripheral step of the pipette tip in order to push the pipette tip off of the neck.

11. The pipette according to claim 9, further comprising an ejection pusher comprising an upper end and a lower end, wherein the ejection pusher is configured to be guided in a vertical direction along the pipette housing, wherein the upper end of the ejection pusher is connected to an ejection button and the lower end of the ejection pusher is radially offset to the lower end of the pusher, wherein the lower end of the pusher is positioned lower than the lower end of the ejection pusher, wherein clamping the pipette tip including a flat upper edge onto the neck is configured to upwardly displace the pusher without upwardly displacing the ejection pusher, and wherein actuation of the ejection button is configured to press the ejection pusher against the upper end of the pipette tip so that the pipette tip can be removed from the neck.

12. The pipette according to claim 4, wherein the pusher is connected to an ejection button projecting from the top end of the pipette housing, wherein actuation of the ejection button is configured to displace the pusher downward, wherein the lower pusher end is configured to eject the pipette tip from the neck.

13. The pipette according to claim 4, further comprising:

a fourth stop apparatus comprising, a seventh stop element positioned on an ejection button, and an eighth stop element positioned on the pipette housing, wherein the seventh stop element and the eighth stop element are configured to limit the displacement of the ejection button upward; and a transmission apparatus positioned between the ejection button and the pusher, wherein the transmission apparatus is configured to prevent upward displacement of the ejection button when the pusher is displaced upward, and wherein the transmission apparatus is further configured to displace the pusher downward when the ejection button is displaced downward.

14. The pipette according to claim 13, wherein the transmission apparatus is a fourth spring apparatus that contacts the ejection button and the pusher, wherein an upward displacement of the pusher compresses the fourth spring apparatus, wherein a downward displacement of the ejection button compresses the fourth spring apparatus, and wherein the ejection button entrains the pusher.

15. The pipette according to claim 13, wherein the transmission apparatus is a locking device positioned between the ejection button and the pusher that is configured to permit an upward displacement of the pusher relative to the ejection button, and further configured to inhibit a downward displacement of the ejection button relative to the pusher.

* * * * *